US005995638A

United States Patent [19]

Amidror et al.

[11] Patent Number: 5,995,638

[45] Date of Patent: Nov. 30, 1999

[54] METHODS AND APPARATUS FOR AUTHENTICATION OF DOCUMENTS BY USING THE INTENSITY PROFILE OF MOIRE PATTERNS

[75] Inventors: Isaac Amidror, Lausanne; Roger D. Hersch, Epalinges, both of Switzerland

[73] Assignee: Ecole Polytechnique Fédérale de Lausanne, Lausanne, Switzerland

[21] Appl. No.: 08/675,914

[22] Filed: Jul. 5, 1996

Related U.S. Application Data

[63] Continuation-in-part of application No. 08/520,334, Aug. 28, 1995.

[51] Int. Cl.[6] .................... G06K 9/00

[52] U.S. Cl. .................... 382/100; 380/54; 283/93

[58] Field of Search .................... 283/72, 17, 93, 283/94, 902; 382/137, 181, 100, 135, 279; 380/54

[56] References Cited

U.S. PATENT DOCUMENTS

| | | | |
|---|---|---|---|
| 5,018,767 | 5/1991 | Wicker | 283/67 |
| 5,275,870 | 1/1994 | Halope et al. | 428/199 |
| 5,396,559 | 3/1995 | McGrew | 380/54 |

FOREIGN PATENT DOCUMENTS

| | | | |
|---|---|---|---|
| 1138011 | 12/1968 | United Kingdom | B41M 3/14 |
| 2224240 | 5/1990 | United Kingdom | B42D 15/00 |

OTHER PUBLICATIONS

"A Generalized Fourier–Based Method for the Analysis of 2D Moire Envelope–Forms in Screen Superpositions", by I. Amidror; *Journal of Modern Optics,* vol. 41, No. 9, 1994; pp. 1837–1862.

"Making Money", by G. Stix; *Scientific American,* Mar. 1994; pp. 81–83.

*Linear Systems, Fourier Transforms, and Optics,* by J. D. Gaskill, John Wiley & Sons, 1978; pp. 113, 314.

*Fourier Theorems,* by D. C. Champeney, Cambridge University Press, 1987; p. 166.

*Trigonometric Series,* vol. 1, by A. Zygmund, Cambridge University Press, 1968; p. 36.

*Digital Halftoning,* by R. Ulichney, The MIT Press, 1988; Chapter 5.

*Digital Image Processing and Computer Vision,* by R. J. Schalkoff, John Wiley & Sons, 1989, pp. 279–286.

"Microlens arrays", by M. Hutley et al.; *Physics World,* Jul. 1991; pp. 27–32.

*Computer Graphics:Principles and Practice,* by J. D. Foley, A. Van Dam, S. K. Feiner and J.F. Hughes, Addison–Wesley, 1990 (second edition); Section 13.3.3. p. 539.

*Digital Image Processing,* by W. K. Pratt, Wiley–Interscience, 1991; Chapter 14.

*Primary Examiner*—Andrew W. Johns

[57] ABSTRACT

New method and apparatus for authenticating security documents such as banknotes, passports, etc. which may be printed on any support, including transparent synthetic materials and traditional opaque materials such as paper. The invention is based on moire patterns occuring between superposed dot-screens. By using a specially designed basic screen and master screen, where at least the basic screen is comprised in the document, a moire intensity profile of a chosen shape becomes visible in their superposition, thereby allowing the authentication of the document. If a microlens array is used as a master screen, the document comprising the basic screen may be printed on an opaque reflective support, thereby enabling the visualization of the moire intensity profile by reflection. Different variants of the invention are disclosed, some of which are specially adapted for use as covert features. Automatic document authentication is supported by an apparatus comprising a master screen, an image acquisition means such as a CCD camera and a comparing processor whose task is to compare the acquired moire intensity profile with a prestored reference image. Depending on the match, the document handling device connected to the comparing processor accepts or rejects the document. An important advantage of the present invention is that it can be incorporated into the standard document printing process, so that it offers high security at the same cost as standard state of the art document production.

27 Claims, 28 Drawing Sheets

110

EPFL
LSP

EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP
EPFLEPFLEPFLEPFLEPFLEPFLEPFLEPFLEPFLEPFLEPFL
LSPLSPLSPLSPLSPLSPLSPLSPLSPLSP

FIG. 11A

FIG. 11C

111

USA
$50

USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50
USAUSAUSAUSAUSAUSAUSAUSAUSAUSA
$50$50$50$50$50$50$50$50$50$50

FIG. 11B

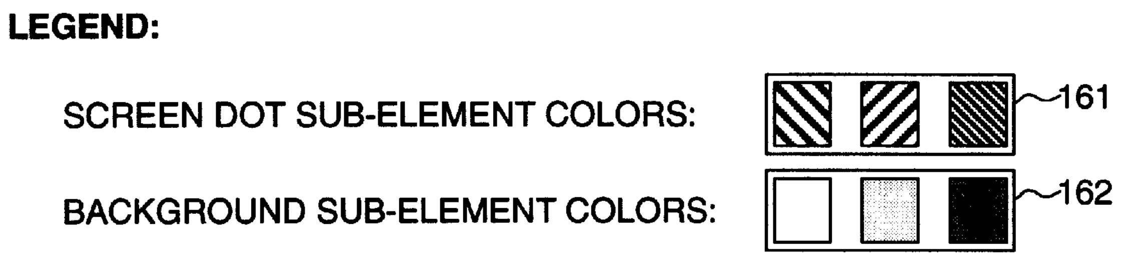
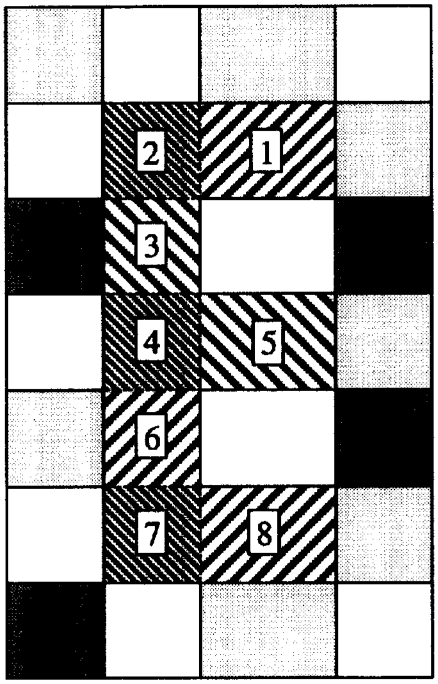
FIG. 16A
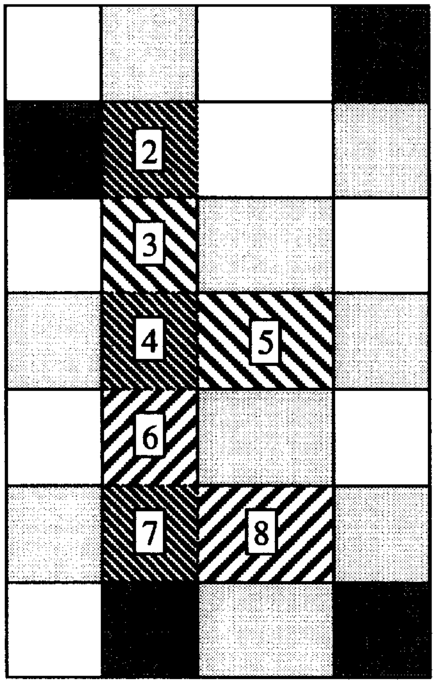
FIG. 16B

METHODS AND APPARATUS FOR AUTHENTICATION OF DOCUMENTS BY USING THE INTENSITY PROFILE OF MOIRE PATTERNS

This application is a continuation-in-part of Application Ser. No. 08/520,334 filed Aug. 28, 1995.

BACKGROUND OF THE INVENTION

The present invention relates generally to the field of anticounterfeiting and authentication methods and devices and, more particularly, to a method and apparatus for authentication of valuable documents using the intensity profile of moire patterns.

Counterfeiting documents such as banknotes is becoming now more than ever a serious problem, due to the availability of high-quality and low-priced color photocopiers and desk-top publishing systems (see, for example, "Making Money", by Gary Stix, Scientific American, March 1994, pp. 81–83).

The present invention is concerned with providing a novel security element and authentication means offering enhanced security for banknotes, checks, credit cards, travel documents and the like, thus making them even more difficult to counterfeit than present banknotes and security documents.

Various sophisticated means have been introduced in prior art for counterfeit prevention and for authentication of documents. Some of these means are clearly visible to the naked eye and are intended for the general public, while other means are hidden and only detectable by the competent authorities, or by automatic devices. Some of the already used anti-counterfeit and authentication means include the use of special paper, special inks, watermarks, micro-letters, security threads, holograms, etc. Nevertheless, there is still an urgent need to introduce further security elements, which do not considerably increase the cost of the produced documents.

Moire effects have already been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moire pattern of high contrast. Similar methods are also applied to the prevention of digital photocopying or digital scanning of documents (for example, U.S. Pat. No. 5,018,767 (Wicker), or U.K. Pat. Application No. 2,224,240 A (Kenrick & Jefferson)). In all these cases, the presence of moire patterns indicates that the document in question is counterfeit. However, in prior art no advantage is taken of the intentional generation of a moire pattern having a particular intensity profile, whose existence, and whose precise shape, are used as a means of authentifying the document. The only method known until now in which a moire effect is used to make visible an image en coded on the document (as described, for example, in the section "Background" of U.S. Pat. No. 5,396,559 (McGrew)) is based on the physical presence of that image on the document as a latent image, using the technique known as "phase modulation". In this technique, a uniform line grating or a uniform random screen of dots is printed on the document, but within the pre-defined borders of the latent image on the document the same line grating (or respectively, the same random dot-screen) is printed in a different phase, or possibly in a different orientation. For a layman, the latent image thus printed on the document is hard to distinguish from its background; but when a reference transparency consisting of an identical, but unmodulated, line grating (respectively, random dot-screen) is superposed on the document, thereby generating a moire effect, the latent image pre-designed on the document becomes clearly visible, since within its pre-defined borders the moire effect appears in a different phase than in the background. However, this previously known method has the major flaw of being simple to simulate, since the form of the latent image is physically present on the document and only filled by a different texture. The existence of such a latent image on the document will not escape the eye of a skilled person, and moreover, its imitation by filling the form by a texture of lines (or dots) in an inversed (or different) phase can easily be carried out by anyone skilled in the graphics arts.

The approach on which the present invention is based completely differs from this technique, since no phase modulation techniques are used, and furthermore, no latent image is present on the document. On the contrary, all the spatial information which is made visible by the moire intensity profiles according to the present invention is encoded in the specially designed forms of the individual dots which constitute the dot-screens. The approach on which the present invention is based further differs from that of prior art in that it not only provides full mastering of the qualitative geometric properties of the generated moire (such as its period and its orientation), but it also enables the intensity levels of the generated moire to be quantitatively determined.

SUMMARY OF THE INVENTION

The present invention relates to a new method and apparatus for authenticating documents such as banknotes, trust papers, securities, identification cards, passports, etc. This invention is based on the moire phenomena which are generated between two or more specially designed dot-screens, at least one of which being printed on the document itself. Each dot-screen consists of a lattice of tiny dots, and is characterized by three parameters: its repetition frequency, its orientation, and its dot shapes. The dot-screens used in the present invention are similar to dot-screens which are used in classical halftoning, but they have specially designed dot shapes, frequencies and orientations, in accordance with the present disclosure. Such dot-screens with simple dot shapes may be produced by classical (optical or electronic) means, which are well known to people skilled in the art. Dot-screens with more complex dot shapes may be produced by means of the method disclosed in co-pending U.S. patent application Ser. No. 08/410,767 filed Mar. 27, 1995 (Ostromoukhov, Hersch).

When the second dot-screen (hereinafter: "the master screen") is laid on top of the first dot-screen (hereinafter: "the basic screen"), in the case where both screens have been designed in accordance with the present disclosure, there appears in the superposition a highly visible repetitive moire pattern of a predefined intensity profile shape. For example, the repetitive moire pattern may consist of any predefined letters, digits or any other preferred symbols (such as the country emblem, the currency, etc.).

As disclosed in U.S. Pat. No. 5,275,870 (Halope et al.) it may be advantageous in the manufacture of long lasting documents or documents which must withstand highly adverse handling to replace paper by synthetic material. Transparent sheets of synthetic materials have been successfully introduced for printing banknotes (for example, Australian banknotes of 5 or 10 Australian Dollars).

The present invention concerns a new method for authenticating documents which may be printed on various supports, including (but not limited to) such transparent synthetic materials. In one embodiment of the present invention, the moire intensity profile shapes can be visualized by superposing a basic screen and a master screen which are both printed on two different areas of the same document (banknote, etc.). In a second embodiment of the present invention, only the basic screen appears on the document itself, and the master screen is superposed on it by the human operator or the apparatus which visually or optically validates the authenticity of the document. In a third embodiment of this invention, the basic screen appears on the document itself, and the master screen which is used by the human operator or by the apparatus is a sheet of microlenses (hereinafter: "microlens array"). An advantage of this third embodiment is that it applies equally well to both transparent support, where the moire is observed by transmittance, and to opaque support, where the moire is observed by reflection. (The term "opaque support" as employed in the present disclosure also includes the case of transparent materials which have been made opaque by an inking process or by a photographic or any other process.)

The fact that moire effects generated between superposed dot-screens are very sensitive to any microscopic variations in the screened layers makes any document protected according to the present invention practically impossible to counterfeit, and serves as a means to distinguish easily between a real document and a falsified one.

It should be noted that the dot-screens which appear on the document itself in accordance with the present invention may be printed on the document like any screened (halftoned) image, within the standard printing process, and therefore no additional cost is incurred in the document production.

Furthersore, the dot-screens printed on the document in accordance with the present invention need not be of a constant intensity level. On the contrary, they may include dots of gradually varying sizes and shapes, and they can be incorporated (or dissimulated) within any halftoned image printed on the document (such as a portrait, landscape, or any decorative motif, which may be different from the motif generated by the moire effect in the superposition). To reflect this fact, the terms "basic screen" and "master screen" used hereinafter will also include cases where the basic screens (respectively: the master screens) are not constant and represent halftoned images. (As is well known in the art, the dot sizes in halftoned images determine the intensity levels in the image: larger dots give darker intensity levels, while smaller dots give brighter intensity levels.)

In the present disclosure different variants of the invention are described, some of which are intended to be used by the general public (hereinafter: "overt" features), while other variants can only be detected by the competent authorities or by automatic devices (hereinafter: "covert" features). In the latter case, the information carried by the basic screen is masked using any of a variety of techniques, which can be classified into three main methods: the masking layer method; the composite basic screen method; the perturbation patterns method; and any combinations thereof. These different variants of the present invention are described in detail later in the present disclosure. Also described in the present disclosure is the multichromatic case, in which the dot-screens used are multichromatic, thereby generating a multichromatic moire effect.

The terms "print" and "printing" in the pre sent disclosure refer to any process for transferring an image on to a support, including by means of a lithographic, photographic or any other process.

The disclosures "A generalized Fourier-based method for the analysis of 2D moire envelope-forms in screen superpositions" by I. Amidror, Journal of Modem Optics, Vol. 41, 1994, pp. 1837–1862 (hereinafter, "Amidro94") and U.S. patent application Ser. No. 08/410,767 (Ostromoukhov, Hersch) have certain information an d content which may relate to the present invention and aid in understanding thereof.

BRIEF DESCRIPTION OF THE, DRAWINGS

The invention will be further described, by way of example only, with reference to the accompanying figures, in which:

FIG. 11A is a largely magnified view of a dot-screen comprising black dots having the shape of "EPFL/LSP";

FIG. 11B is a largely magnified view of a dot-screen comprising black dots having the shape of "USA/$50";

FIG. 11C is a largely magnified view of a composite basic screen obtained by the superposition of the dot-screens of FIG. 11A and FIG. 11B with an angle difference of about 45 degrees;

Figure 12A:
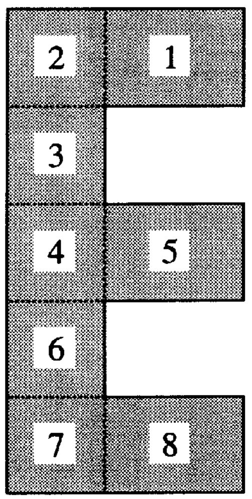
FIG. 12A is a greatly magnified view of one letter ("E") from the screen dot 110 of FIG. 11A, showing a possible division into sub-elements.
Figure 12B:
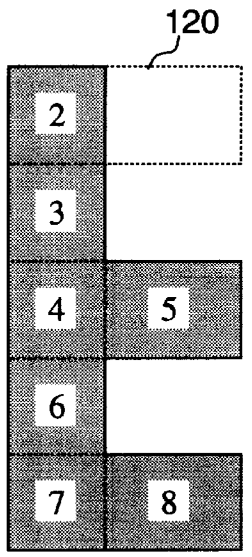
FIGS. 12B, 12C and 12D show how missing sub-elements can render the letter of FIG. 12A unintelligible.
Figure 15A:
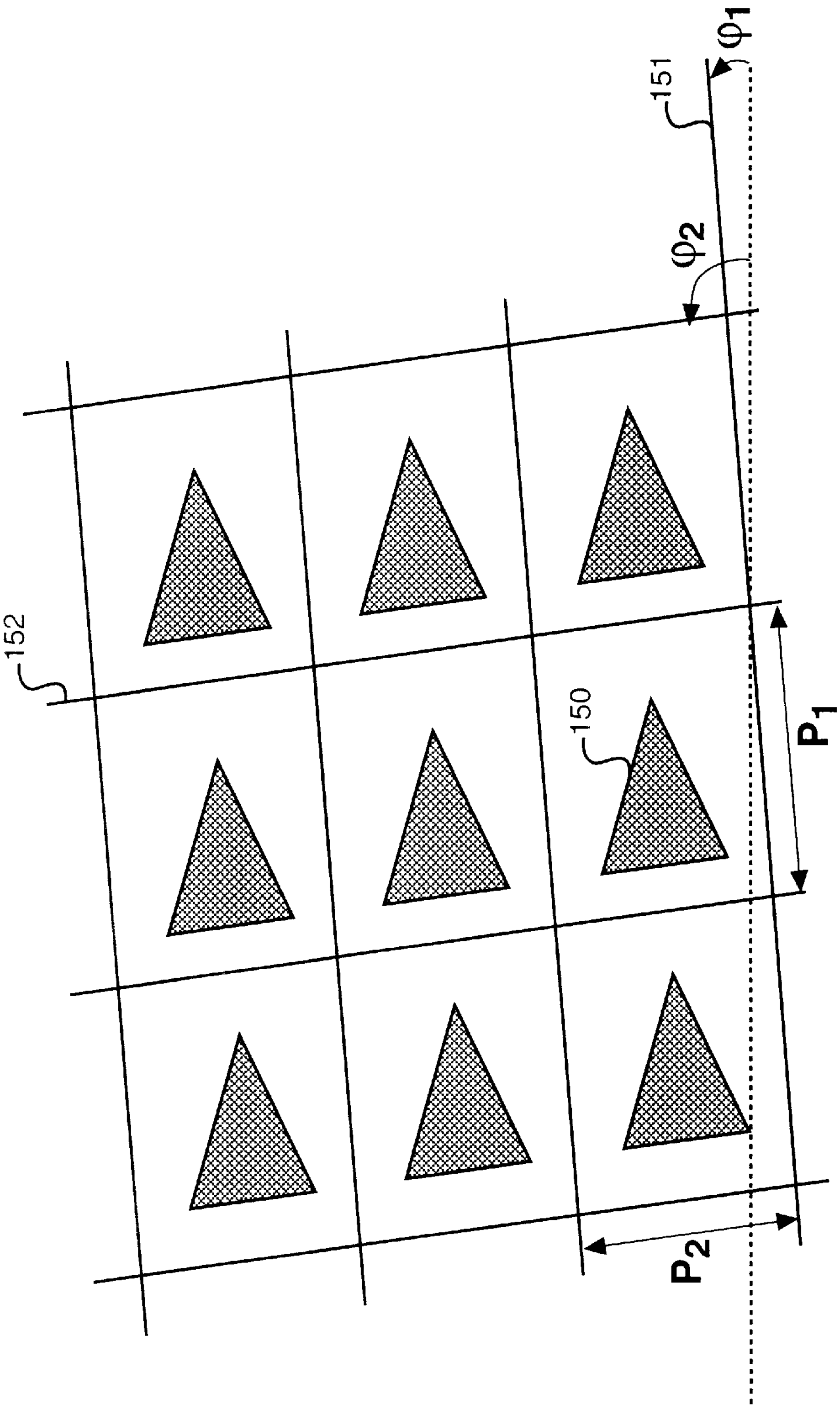
Figure 15B:
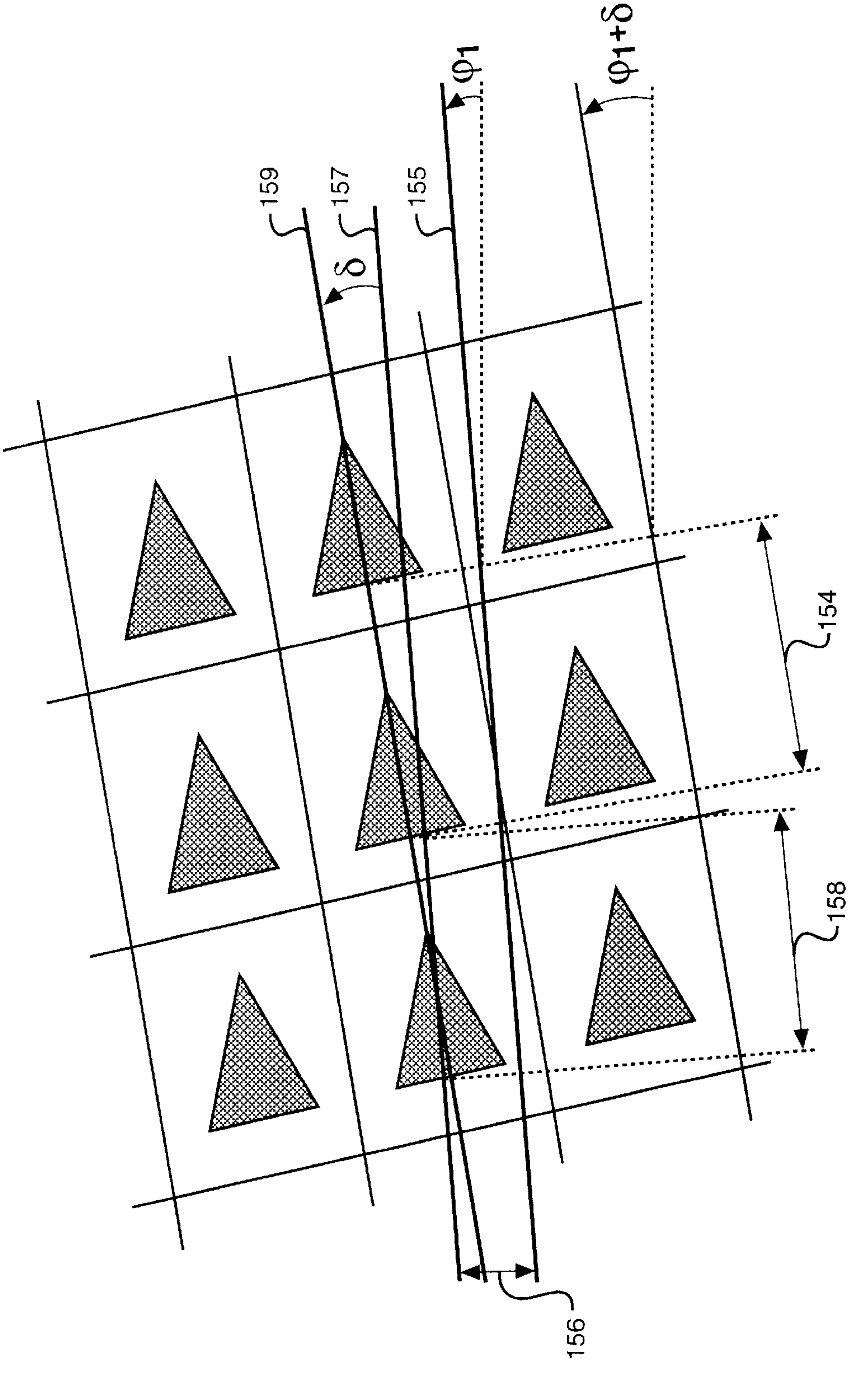
Figure 15C:
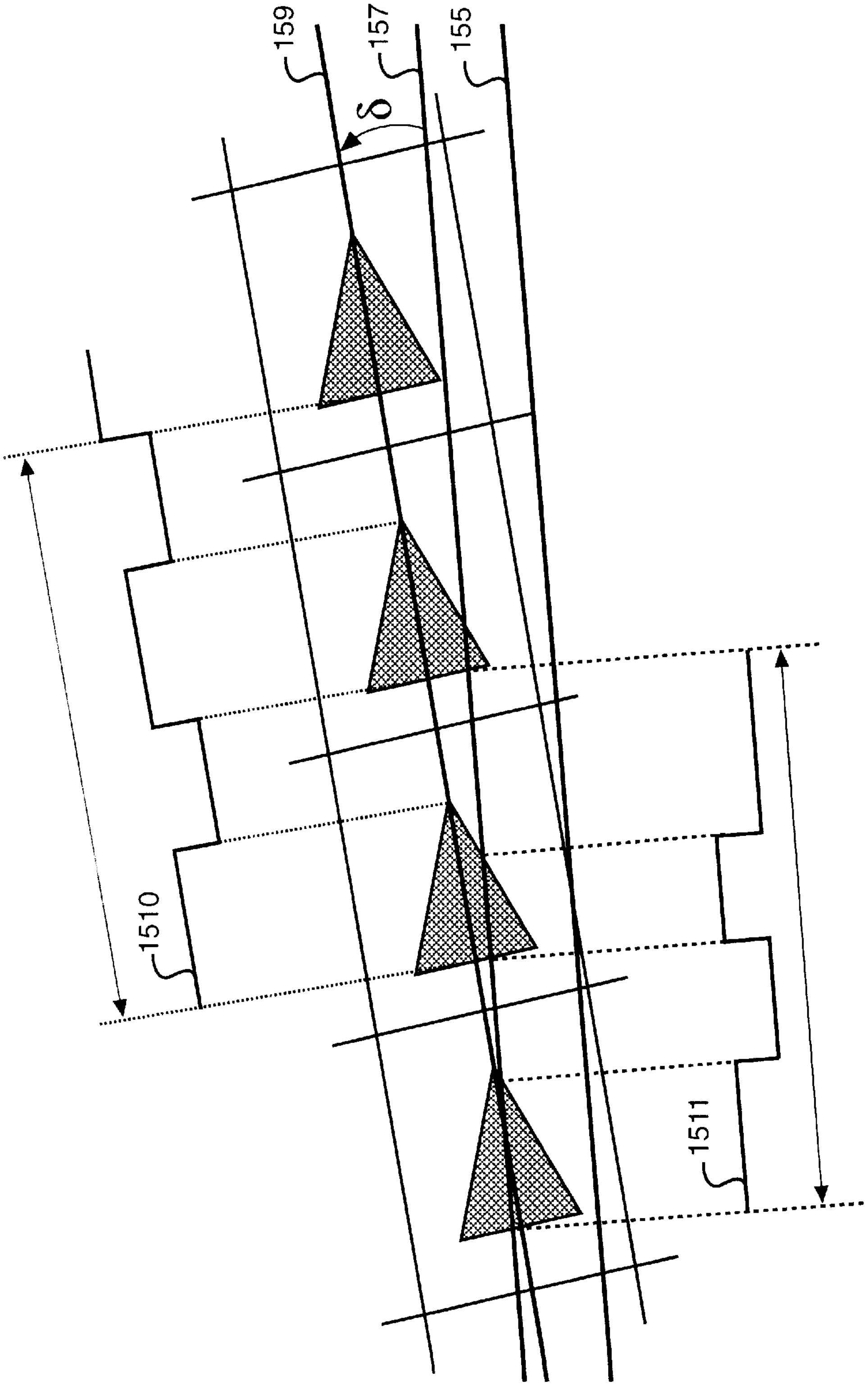

FIG. 15A schematically shows a prestored moire intensity profile, its periods and its orientations;

FIG. 15B schematically shows an acquired moire intensity profile with its rotation angle error $\delta$;

FIG. 15C schematically shows the intensity signals obtained when intersecting an acquired moire intensity profile by straight lines; and FIGS. 16A and 16B show multichromatic variants of FIG. 12A and FIG. 12B, respectively.

Figure 17:
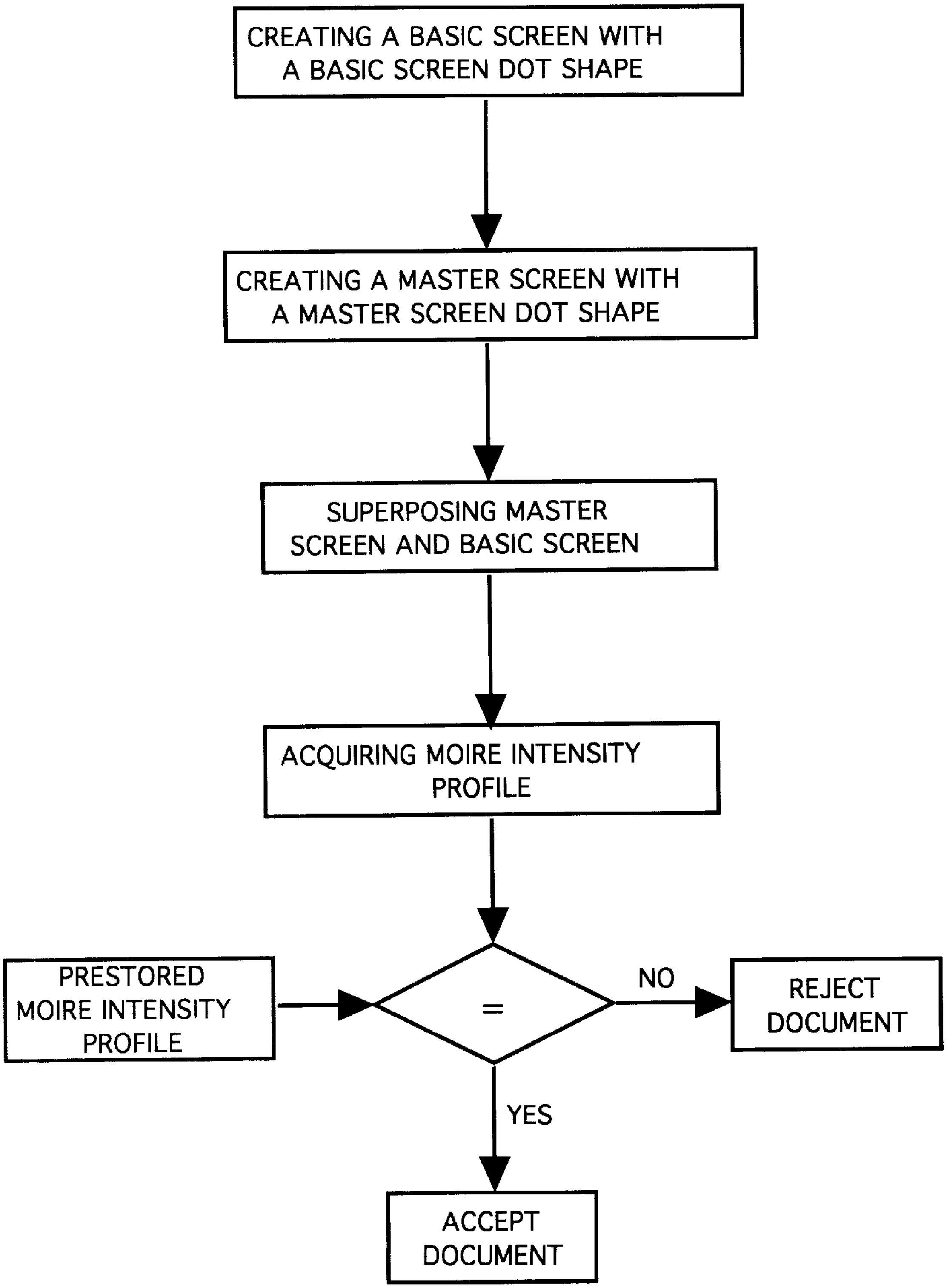

FIG. 17 Illustrates a block diagram with the steps of methods of the invention summarized therein.

DETAILED DESCRIPTION

The present invention is based on the intensity profiles of the moire patterns which occur in the superposition of dot-screens. The explanation of these moire intensity profiles is based on the duality between two-dimensional (hereinafter: "2D") periodic images in the (x,y) plane and their 2D spectra in the (u,v) frequency plane through the 2D Fourier transform. For the sake of simplicity, the explanation hereinafter is given for the monochromatic case, although the present invention is not limited only to the monochromatic case, and it relates just as well to the moire intensity profiles in the multichromatic case.

As is known to people skilled in the art, any monochromatic image can be represented in the image domain by a reflectance function, which assigns to each point (x,y) of the image a value between 0 and 1 representing its light reflectance: 0 for black (i.e. no reflected light), 1 for white (i.e. full light reflectance), and intermediate values for in-between shades. In the case of transparencies, the reflectance function is replaced by a transmittance function defined in a similar way. When m monochromatic images are superposed, the reflectance of the resulting image is given by the product of the reflectance functions of the individual images:

$$r(x,y)=r_1(x,y)r_2(x,y)\ldots r_m(x,y) \qquad (1)$$

According to a theorem known in the art as "the Convolution theorem", the Fourier transform of the product function is the convolution of the Fourier transforms of the individual functions (see, for example, "Linear Systems, Fourier Transforms, and Optics" by J. D. Gaskill, 1978, p. 314). Therefore, denoting the Fourier transform of each function by the respective capital letter and the 2D convolution by "**", the spectrum of the superposition is given by:

$$p(u,v)=r_1(u,v)r_2(u,v)\ldots r_m(u,v) \qquad (2)$$

In the present disclosure we are basically interested in periodic images, such as line-gratings or dot-screens, and their superpositions. This implies that the spectrum of the image on the (u,v)-plane is not a continuous one but rather consists of impulses, corresponding to the frequencies which appear in the Fourier series decomposition of the image (see, for example, "Linear Systems, Fourier Transforms, and Optics" by J. D. Gaskill, 1978, p. 113). A strong impulse in the spectrum indicates a pronounced periodic component in the original image at the frequency and direction represented by that impulse. In the case of a 1-fold periodic image, such as a line-grating, the spectrum consists of a ID "comb" of impulses through the origin; in the case of a 2-fold periodic image the spectrum is a 2D "nailbed" of impulses through the origin.

Each impulse in the 2D spectrum is characterized by three main properties: its label (which is its index in the Fourier series development); its geometric location in the spectrum plane (which is called: "the impulse location"), and its amplitude. To the geometric location of any impulse is attached a frequency vector f in the spectrum plane, which connects the spectrum origin with the geometric location of the impulse. In terms of the original image, the geometric location of an impulse in the spectrum determines the frequency and the direction of the corresponding periodic component in the image, and the amplitude of the impulse represents the intensity of that periodic component in the image.

The question of whether or not an impulse in the spectrum represents a visible periodic component in the image strongly depends on properties of the human visual system. The fact that the eye cannot distinguish fine details above a certain frequency (i.e. below a certain period) suggests that the human visual system model includes a low-pass filtering stage. When the frequencies of the original image elements are beyond the limit of frequency visibility, the eye can no longer see them; but if a strong enough impulse in the spectrum of the image superposition falls closer to the spectrum origin, then a moire effect becomes visible in the superposed image.

According to the Convolution theorem (Eqs. (1), (2)), when m line-gratings are superposed in the image domain, the resulting spectrum is the convolution of their individual spectra. This convolution of combs (or nailbeds) can be seen as an operation in which frequency vectors from the individual spectra are added vectorially, while the corresponding impulse amplitudes are multiplied. More precisely, each impulse in the spectrum-convolution is generated during the convolution process by the contribution of one impulse from each individual spectrum: its location is given by the sum of their frequency vectors, and its amplitude is given by the product of their amplitudes. This enables us to introduce an indexing method for denoting each of the impulses of the spectrum-convolution in a unique, unambiguous way. The general impulse in the spectrum-convolution will be denoted the "$(k_1,k_2, \ldots ,k_m)$-impulse," where m is the number of superposed gratings, and each integer $k_i$ is the index (harmonic), within the comb (the Fourier series) of the i-th spectrum, of the impulse that this i-th spectrum contributed to the impulse in question in the convolution. Using this formal notation the geometric location of the general $(k_1,k_2, \ldots ,k_m)$-impulse in the spectrum-convolution is given by the vectorial sum (or linear combination):

$$f_{k_1,k_2, \ldots ,k_m}=k_1f_1+k_2f_2+\ldots +k_mf_m \quad (3)$$

and the impulse amplitude is given by:

$$a_{k_1,k_2, \ldots ,k_m}=a^{(1)}{}_{k_1}a^{(2)}{}_{k_2}\ldots a^{(m)}{}_{k_m} \quad (4)$$

where $f_i$ denotes the frequency vector of the fundamental impulse in the spectrum of the i-th grating, and $k_if_i$ and $a^{(i)}{}_{k_i}$ are respectively the frequency vector and the amplitude of the $k_i$-th harmonic impulse in the spectrum of the i-th grating.

A $(k_1,k_2, \ldots ,k_m)$-impulse of the spectrum-convolution which falls close to the spectrum origin, within the range of visible frequencies, represents a moire effect in the superposed image. See for example the moire effect in the two-grating superposition of FIG. 1C, which is represented in the spectrum convolution by the (1,–1)-impulse shown by 11 in FIG. 1F (obviously, this impulse is also accompanied by its respective symmetrical twin 12 to the opposite side of the spectrum origin, namely, the (–1,1)-impulse. The range of visible frequencies is schematically represented in FIG. 1F by circle 10). We call the m-grating moire whose fundamental impulse is the $(k_1,k_2, \ldots ,k_m)$-impulse in the spectrum-convolution a "$(k_1,k_2, \ldots ,k_m)$-moire"; the highest absolute value in the index-list is called the "order" of the moire. For example, the 2-grating moire effect of FIGS. 1C and 1F is a (1,–1)-moire, which is a moire of order 1. It should be noted that in the case of doubly periodic images, such as in dot-screens, each superposed image contributes two perpendicular frequency vectors to the spectrum, so that in Eqs. (3) and (4) m represents twice the number of superposed images.

The vectorial sum of Eq. (3) can also be written in terms of its Cartesian components. If $f_i$ are the frequencies of the m original gratings and $\theta_i$ are the angles that they form with the positive horizontal axis, then the coordinates $(f_u,f_v)$ of the $(k_1,k_2, \ldots ,k_m)$-impulse in the spectrum-convolution are given by:

$$f_{u\,k_1,k_2, \ldots ,k_m}=k_1f_1\cos\theta_1+k_2f_2\cos\theta_2+\ldots +k_mf_m\cos\theta_m$$

$$f_{v\,k_1,k_2, \ldots ,k_m}=k_1f_1\sin\theta_1+k_2f_2\sin\theta_2+\ldots +k_mf_m\sin\theta_m \quad (5)$$

Therefore, the frequency, the period and the angle of the $(k_1,k_2, \ldots ,k_m)$-impulse (and of the $(k_1,k_2, \ldots ,k_m)$-moire it represents) are given by the length and the direction of the vector $f_{k_1,k_2, \ldots ,k_m}$, as follows:

$$f=\sqrt{f_u^2+f_v^2} \qquad T=1/f \qquad \varphi=\arctan(f_v/f_u) \quad (6)$$

Note that in the special case of the (1,–1)-moire between m=2 gratings, where a moire effect occurs due to the vectorial sum of the frequency vectors $f_1$ and $-f_2$, these formulas are reduced to the well-known formulas of the period and angle of the moire effect between two gratings:

$$T_M=\frac{T_1T_2}{\sqrt{T_1^2+T_2^2-2T_1T_2\cos\alpha}} \quad (7)$$

-continued $$\sin\varphi_M=\frac{T_1\sin\alpha}{\sqrt{T_1^2+T_2^2-2T_1T_2\cos\alpha}}$$

(where $T_1$ and $T_2$ are the periods of the two original gratings and $\alpha$ is the angle difference between them, $\theta_2-\theta_1$). When $T_1=T_2$ this is further simplified into the well-known formulas:

$$T_M=\frac{T}{2\sin(\alpha/2)} \qquad \varphi_M=90^\circ-\alpha/2 \quad (8)$$

The moire patterns obtained in the superposition of periodic structures can be described at two different levels. The first, basic level only deals with geometric properties within the (x,y)-plane, such as the periods and angles of the original images and of their moire patterns. The second level also takes into account the amplitude properties, which can be added on top of the planar 2D descriptions of the original structures or their moire patterns as a third dimension, z=g(x,y), showing their intensities or gray-level values. (In terms of the spectral domain, the first level only considers the impulse locations (or frequency vectors) within the (u,v)-plane, while the second level also considers the amplitudes of the impulses.) This 3D representation of the shape and the intensity variations of the moire pattern is called "the moire intensity profile".

The present disclosure is based on the analysis, using the Fourier approach, of the intensity profiles of moire patterns which are obtained in the superposition of periodic layers such as line-gratings, dot-screens, etc. This analysis is described in the following section for the simple case of line-grating superpositions, and then, in the next section, for the more complex case of dot-screen superpositions.

Moires between superposed line-gratings

Figure 1A:
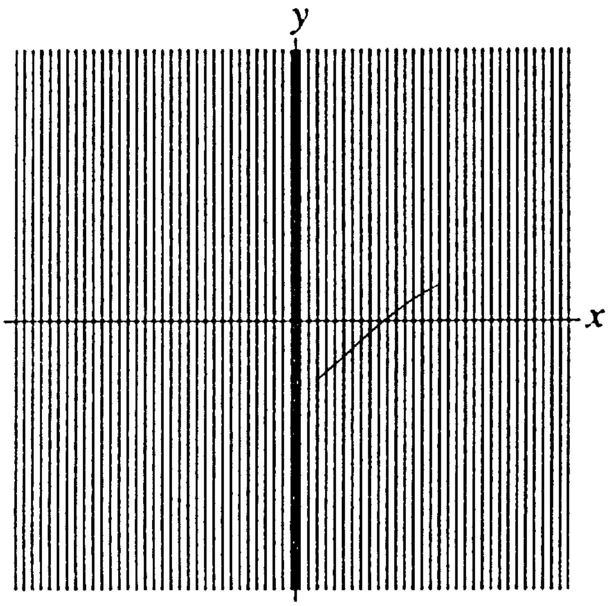
FIGS. 1A and 1B show two line-gratings.
Figure 1D:
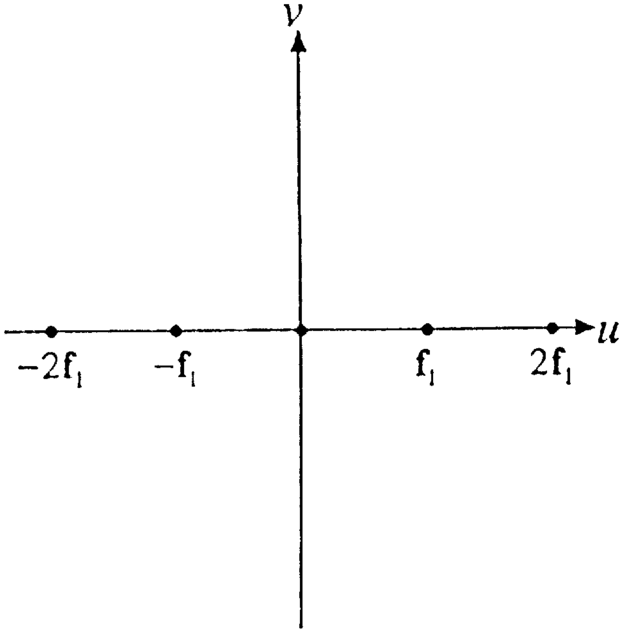
FIGS. 1D and 1E show the spectra of the line-gratings of FIGS. 1A and 1B, respectively.
Figure 1B:
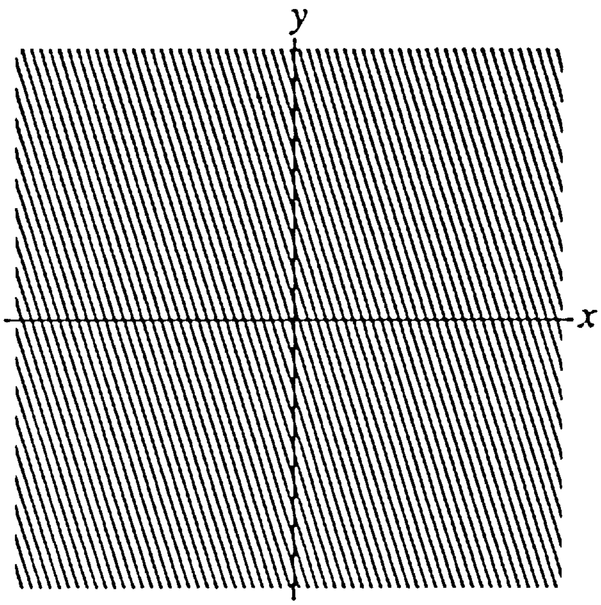
Figure 1E:
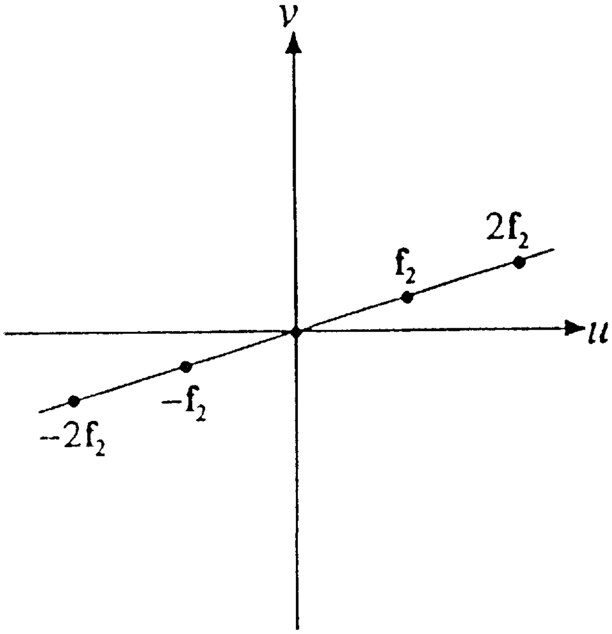
Figure 1C:
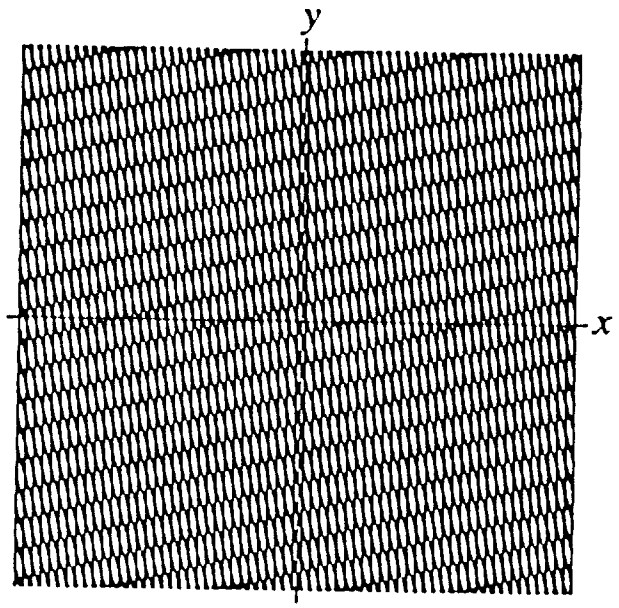
FIG. 1C shows the superposition of the two line-gratings of FIGS. 1A and 1B, where the (1,−1)-moire is clearly seen.
Figure 1F:
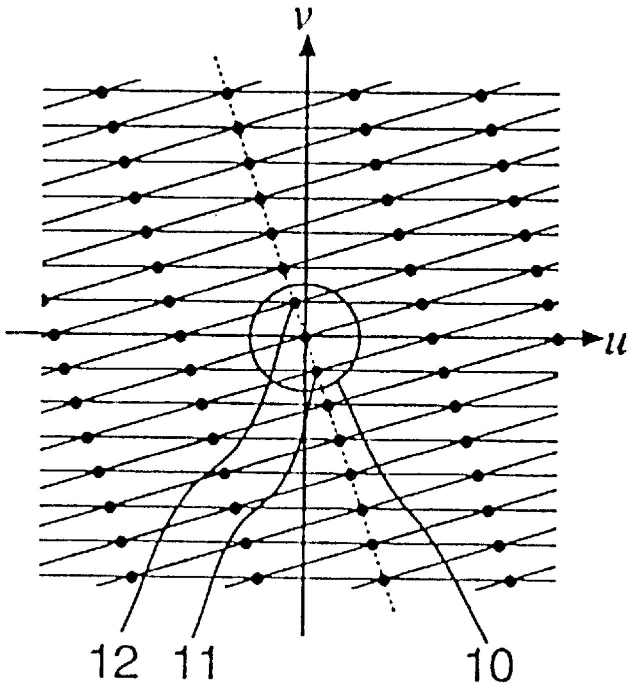
FIG. 1F shows the spectrum of the superposition, which is the convolution of the spectra of FIGS. 1D and 1E.
Figure 1G:
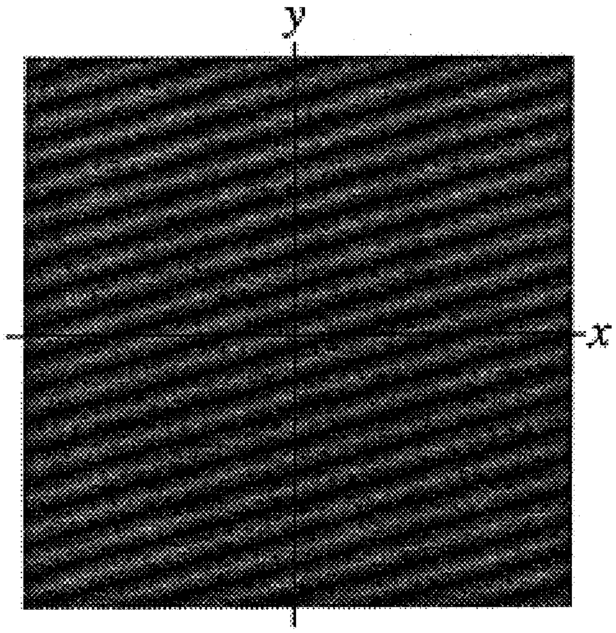
FIG. 1G shows the intensity profile of the (1,−1)-moire of FIG. 1C.
Figure 1H:
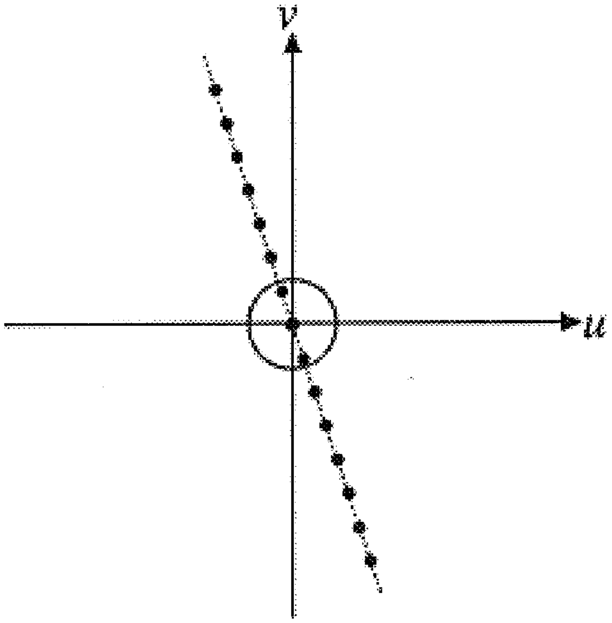
FIG. 1H shows the spectrum of the isolated (1,−1)-moire comb after its extraction from the spectrum of the superposition.

Assume that we are given two line-gratings (like in FIG. 1A and FIG. 1B). The spectrum of each of the line-gratings (see FIG. 1D and FIG. 1E, respectively) consists of an infinite impulse-comb, in which the amplitude of the n-th impulse is given by the coefficient of the n-harmonic term in the Fourier series development of that line-grating. When we superpose (i.e. multiply) two line-gratings the spectrum of the superposition is, according to the Convolution theorem, the convolution of the two original combs, which gives an oblique nailbed of impulses (see FIG. 1F). Each moire which appears in the grating superposition is represented in the spectrum of the superposition by a comb of impulses through the origin which is included in the nailbed. If a moire is visible in the superposition, it means that in the spectral domain the fundamental impulse-pair of the moire-comb (11 and 12 in FIG. 1F) is located close to the spectrum origin, inside the range of visible frequencies (10); this impulse-pair determines the period and the direction of the moire. Now, by extracting from the spectrum-convolution only this infinite moire-comb (FIG. 1H) and taking its inverse Fourier transform, we can reconstruct, back in the image domain, the isolated contribution of the moire in question to the image superposition; this is the intensity profile of the moire (see FIG. 1G).

We denote by $c_n$ the amplitude of the n-th impulse of the moire-comb. If the moire is a $(k_1,k_2)$-moire, the fundamental impulse of its comb is the $(k_1,k_2)$-impulse in the spectrum-convolution, and the n-th impulse of its comb is the $(nk_1, nk_2)$-impulse in the spectrum-convolution. Its amplitude is given by:

$$c_n = a_{nk_1,nk_2}$$

and according to Eq. (4):

$$c_n = a^{(1)}_{nk_1} a^{(2)}_{nk_2}$$

where $a^{(i)}_i$ and $a^{(2)}_i$ are the respective impulse amplitudes from the combs of the first and of the second line-gratings. In other words:

Result 1: The impulse amplitudes of the moire-comb in the spectrum-convolution are determined by a simple term-by-term multiplication of the combs of the original superposed gratings (or subcombs thereof, in case of higher order moires).

For example, in the case of a (1,−1)-moire (as in FIG. 1F) the amplitudes of the moire-comb impulses are given by: $c_n = a_{n,-n} = a^{(1)}_n a^{(2)}_{-n}$.

However, this term-by-term multiplication of the original combs (i.e. the term-by-term product of the Fourier series of the two original gratings) can be interpreted according to a theorem, which is the equivalent of the Convolution theorem in the case of periodic functions, and which is known in the art as the T-convolution theorem (se e “Fourier theorems” by Champeney, 1987, p. 166; “Trigonometric Series Vol. 1” by Zygmund, 1968, p. 36):

T-convolution theorem: Let f(x) and g(x) be functions of period T integrable on a one-period interval 0,T) and let $\{F_n\}$ and $\{G_n\}$ (for n=0,±1,±2, . . . ) be their Fourier series coefficients. Then the function:

$$h(x) = \frac{1}{T}\int_T f(x - x')g(x')dx' \qquad (9)$$

(where $\int_T$ means integration over a one-period interval), which is called “the T-convolution of f and g”, and denoted by “f*g,” is also periodic with the same period T and has Fourier series coefficients $\{H_n\}$ given by: $H_n = F_n G_n$ for all integers n.

The T-convolution theorem can be rephrased in a more illustrative way as follows: If the spectrum of f(x) is a comb with fundamental frequency of 1/T and impulse amplitudes $\{F_n\}$, and the spectrum of g(x) is a comb with the same fundamental frequency and impulse amplitudes $\{G_n\}$, then the spectrum of the T-convolution f*g is a comb with the same fundamental frequency and with impulse amplitudes of $\{F_n G_n\}$. In other words, the spectrum of the T-convolution of the two periodic images is the product of the combs in their respective spectra.

Using this theorem, the fact that the comb of the (1,−1)-moire in the spectral domain is the term-by-term product of the combs of the two original gratings (Result 1) can be interpreted back in the image domain as follows:

The intensity profile of the (1,−1)-moire generated in the superposition of two line-gratings with identical periods T is the T-convolution of the two original line-gratings. If the periods are not identical, they must be first normalized by stretching and rotation transformations, as disclosed in Appendix A of “Amidror94.” This result can be further generalized to also cover higher-order moires:

Result 2: The intensity profile of the general $(k_1,k_2)$-moire generated in the superposition of two line-gratings with periods $T_1$ and $T_2$ and an angle difference a can be seen from the image-domain point of view as a normalized T-convolution of the images belonging to the $k_1$-subcomb of the first grating and to the $k_2$-subcomb of the second grating. In more detail, this can be seen as a 3-stage process:

(1) Extracting the $k_1$-subcomb (i.e. the partial comb which contains only every $k_1$-th impulse) from the comb of the first original line-grating, and similarly, extracting the $k_2$-subcomb from the comb of the second original grating.

(2) Normalization of the two subcombs by linear stretching- and rotation-transformations in order to bring each of them to the period and the direction of the moire, as they are determined by Eq. (3).

(3) T-convolution of the images belonging to the two normalized subcombs. (This can be done by multiplying the normalized subcombs in the spectrum and taking the inverse Fourier transform of the product).

In conclusion, the T-convolution theorem enables us to present the extraction of the moire intensity profile between two gratings either in the image or in the spectral domains. From the spectral point of view, the intensity profile of any $(k_1,k_2)$-moire between two superposed (=multiplied) gratings is obtained by extracting from their spectrum-convolution only those impulses which belong to the $(k_1, k_2)$-moire comb, thus reconstructing back in the image domain only the isolated contribution of this moire to the image of the superposition. On the other hand, from the point of view of the image domain, the intensity profile of any $(k_1,k_2)$-moire between two superposed gratings is a normalized T-convolution of the images belonging to the $k_1$-subcomb of the first grating and to the $k_2$-subcomb of the second grating.

Moires between superposed dot-screens

The moire extraction process described above for the superposition of line-gratings can be generalized to the superposition of doubly periodic dot-screens, where the moire effect obtained in the superposition is really of a 2D nature:

Let f(x,y) be a doubly periodic image (for example, f(x,y) may be a dot-screen which is periodic in two orthogonal directions, $\theta_1$ and $\theta_2+90°$, with an identical period $T_1$ in both directions). Its spectrum F(u,v) is a nailbed whose impulses are located on a lattice $L_1(u,v)$, rotated by the same angle $\theta_1$ and with period of $1/T_1$; the amplitude of a general $(k_1,k_2)$-impulse in this nailbed is given by the coefficient of the $(k_1,k_2)$-harmonic term in the 2D Fourier series development of the periodic function f(x,y).

The lattice $L_1(u,v)$ can be seen as the 2D support of the nailbed F(u,v) on the plane of the spectrum, i.e. the set of all the nailbed impulse-locations. Its unit points (0,1) and (1,0) are situated in the spectrum at the geometric locations of the two perpendicular fundamental impulses of the nailbed F(u,v), whose frequency vectors are $f_1$ and $f_2$. Therefore, the location $w_1$ in the spectrum of a general point $(k_1,k_2)$ of this lattice is given by a linear combination of $f_1$ and $f_2$ with the integer coefficients $k_1$ and $k_2$; and the location $w_2$ of the perpendicular point $(-k_2,k_1)$ on the lattice can also be expressed in a similar way:

$$\begin{aligned} w_1 &= k_1 f_1 + k_2 f_2 \\ w_2 &= -k_2 f_1 + k_1 f_2 \end{aligned} \qquad (10)$$

Let g(x,y) be a second doubly periodic image, for example a dot-screen whose periods in the two orthogonal directions $\theta_2$ and $\theta_2+90°$ are $T_2$. Again, its spectrum G(u,v) is a nailbed whose support is a lattice $L_2(u,v)$, rotated by $\theta_2$ and with a period of $1/T_2$. The unit points (0,1) and (1,0) of the lattice $L_2(u,v)$ are situated in the spectrum at the geometric locations of the frequency vectors $f_3$ and $f_4$ of the two perpendicular fundamental impulses of the nailbed G(u,v). Therefore the location $w_3$ of a general point $(k_3,k_4)$ of this lattice and the location $w_4$ of its perpendicular twin $(-k_4,k_3)$ are given by:

$$w_3 = k_3 f_3 + k_4 f_4 \qquad (11)$$
$$w_4 = -k_4 f_3 + k_3 f_4$$

Assume now that we superpose (i.e. multiply) f(x,y) and g(x,y). According to the Convolution theorem (Eqs. (1) and (2)) the spectrum of the superposition is the convolution of the nailbeds F(u,v) and G(u,v); this means that a centered copy of one of the nailbeds is placed on top of each impulse of the other nailbed (the amplitude of each copied nailbed being scaled down by the amplitude of the impulse on top of which it has been copied).

Figure 2A:
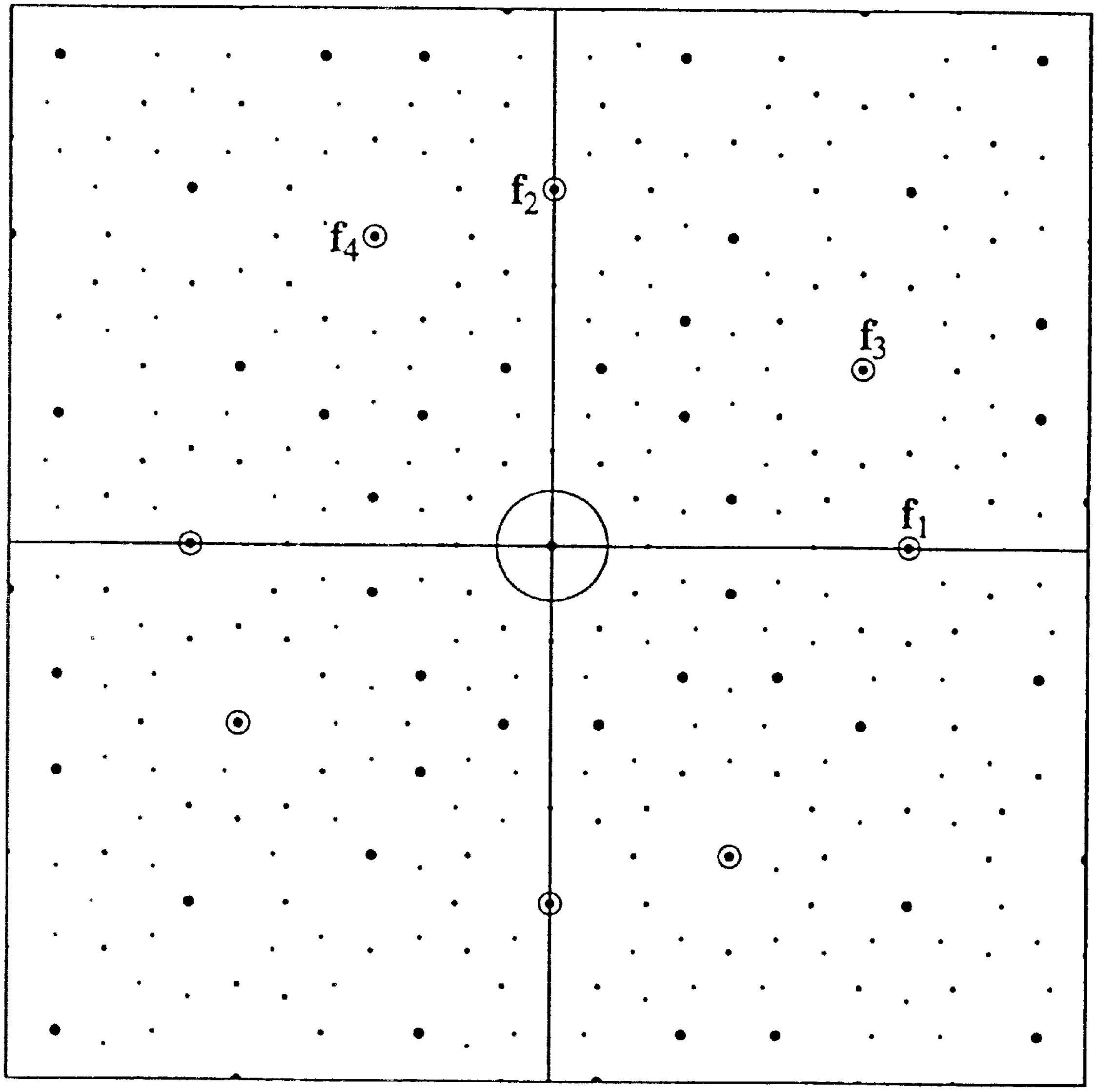
FIGS. 2A, 2B and 2C show the spectrum of the superposition of two dot-screens with identical frequencies, and with angle differences of 30 degrees (in FIG. 2A), 34.5 degrees (in FIG. 2B) and 5 degrees (in FIG. 2C)
Figure 2B:
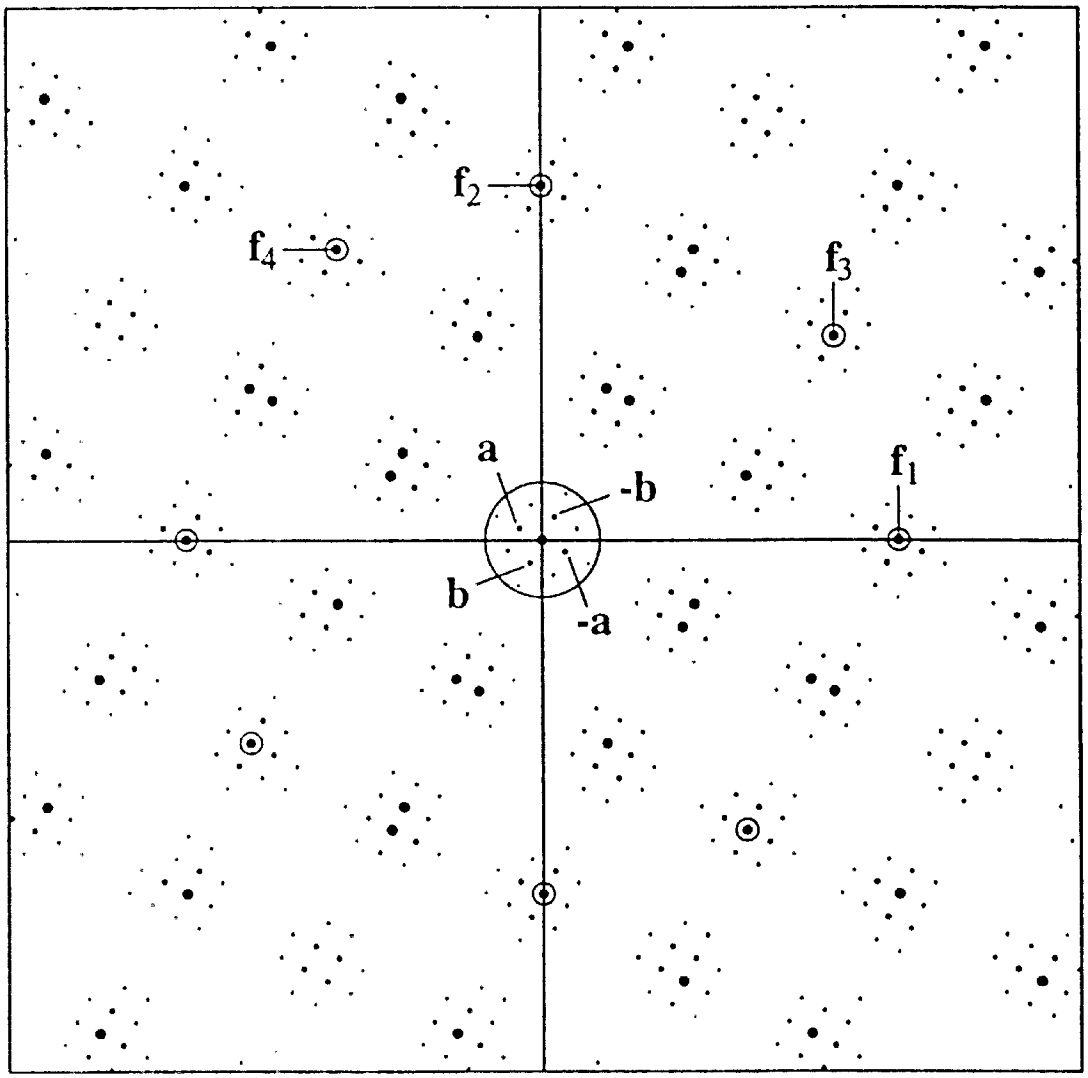
Figure 2C:
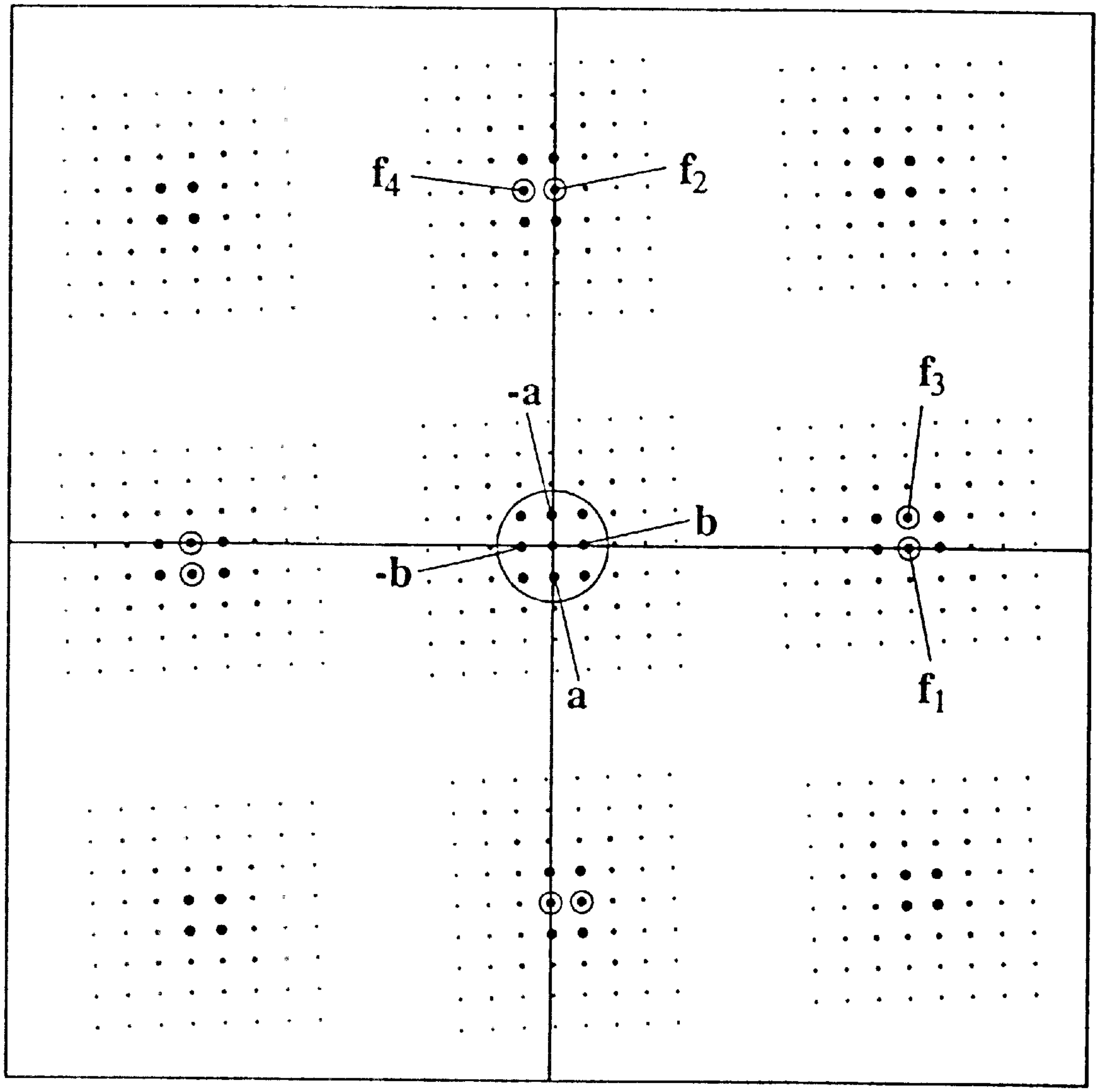

FIG. 2A shows the locations of the impulses in such a spectrum-convolution in a typical case where no moire effect is visible in the superposition (note that only impulses up to the third harmonic are shown). FIGS. 2B and 2C, however, show the impulse locations received in the spectrum-convolution in typical cases in which the superposition does generate a visible moire effect, say a $(k_1,k_2,k_3,k_4)$-moire. As we can see, in these cases the DC impulse at the spectrum origin is closely surrounded by a whole cluster of impulses. The cluster impulses closest to the spectrum origin, within the range of visible frequencies, are the $(k_1,k_2,k_3,k_4)$-impulse of the convolution, which is the fundamental impulse of the moire in question, and its perpendicular counterpart, the $(-k_2,k_1,-k_4,k_3)$-impulse, which is the fundamental impulse of the moire in the perpendicular direction. (Obviously, each of these two impulses is also accompanied by its respective symmetrical twin to the opposite side of the origin). The locations (frequency vectors) of these four impulses are marked in FIGS. 2B and 2C by: a, b, −a and −b. Note that in FIG. 2B the impulse-cluster belongs to the second order (1,2,−2,−1)-moire, while in FIG. 2C the impulse-cluster belongs to the first order (1,0,−1,0)-moire, and consists of another subset of impulses from the spectrum-convolution.

The impulse-cluster surrounding the spectrum origin is in fact a nailbed whose support is the lattice which is spanned by a and b, the locations of the fundamental moire impulses $(k_1,k_2,k_3,k_4)$ and $(-k_2,k_1,-k_4,k_3)$. This infinite impulse-cluster represents in the spectrum the 2D $(k_1,k_2,k_3,k_4)$-moire, and its basis vectors a and b (the locations of the fundamental impulses) determine the period and the two perpendicular directions of the moire. This impulse-cluster is the 2D generalization of the 1D moire-comb that we had in the case of line-grating superpositions. We will call the infinite impulse-cluster of the $(k_1,k_2,k_3,k_4)$-moire the "$(k_1,k_2,k_3,k_4)$-cluster," and we will denote it by: "$M_{k_1,k_2,k_3,k_4}(u,v)$." If we extract from the spectrum of the superposition only the impulses of this infinite cluster, we get the 2D Fourier series development of the intensity profile of the $(k_1,k_2,k_3,k_4)$-moire; in other words, the amplitude of the (i,j)-th impulse of the cluster is the coefficient of the (i,j)-harmonic term in the Fourier series development of the moire intensity profile. By taking the inverse 2D Fourier transform of this extracted cluster we can analytically reconstruct in the image domain the intensity profile of this moire. If we denote the intensity profile of the $(k_1,k_2,k_3,k_4)$-moire between the superposed images f(x,y) and g(x,y) by "$m_{k_1,k_2,k_3,k_4}(x,y)$," we therefore have:

$$m_{k_1,k_2,k_3,k_4}(x,y)=F^{-1}\{M_{k_1,k_2,k_3,k_4}(u,v)\} \qquad (12)$$

The intensity profile of the $(k_1,k_2,k_3,k_4)$-moire between the superposed images f(x,y) and g(x,y) is therefore a function $m_{k_1,k_2,k_3,k_4}(x,y)$ in the image domain whose value at each point (x,y) indicates quantitatively the intensity level of the moire in question, i.e. the particular intensity contribution of this moire to the image superposition. Note that although this moire is visible both in the image superposition $f(x,y)\cdot g(x,y)$ and in the extracted moire intensity profile $m_{k_1,k_2,k_3,k_4}(x,y)$, the latter does not contain the fine structure of the original images f(x,y) and g(x,y) but only the isolated form of the extracted $(k_1,k_2,k_3,k_4)$-moire. Moreover, in a single image superposition $f(x,y)\cdot g(x,y)$ several different moires may be visible simultaneously; but each of them will have a different moire intensity profile $m_{k_1,k_2,k_3,k_4}(x,y)$ of its own.

Let us now find the expressions for the location, the index and the amplitude of each of the impulses of the $(k_1,k_2,k_3,k_4)$-moire cluster. If a is the frequency vector of the $(k_1,k_2,k_3,k_4)$-impulse in the convolution and b is the orthogonal frequency vector of the $(-k_2,k_1,-k_4,k_3)$-impulse, then we have:

$$a = k_1 f_1 + k_2 f_2 + k_3 f_3 + k_4 f_4 \qquad (13)$$
$$b = -k_2 f_1 + k_1 f_2 - k_4 f_3 + k_3 f_4$$

The index-vector of the (i,j)-th impulse in the $(k_1,k_2,k_3,k_4)$-moire cluster is, therefore:

$$i(k_1,k_2,k_3,k_4)+j(-k_2,k_1,-k_4,k_3)=(ik_1-jk_2,\ ik_2+jk_1,\ ik_3-jk_4,\ ik_4+jk_3) \qquad (14)$$

And furthermore, since the geometric locations of the $(k_1,k_2,k_3,k_4)$- and $(-k_2,k_1,-k_4,k_3)$-impulses are a and b (they are the basis vectors which span the lattice $L_M(u,v)$, the support of the moire-cluster), the location of the (i,j)-th impulse within this moire-cluster is given by the linear combination ia+jb:

$$ia+jb=(ik_1-jk_2)f_1+(ik_2+jk_1)f_2+(ik_3-jk_4)f_3+(ik_4+jk_3)f_4 \qquad (15)$$

As we can see, the $(k_1,k_2,k_3,k_4)$-moire cluster is the infinite subset of the full spectrum-convolution which only contains those impulses whose indices are given by Eq. (14), for all integer i,j.

Finally, the amplitude $c_{i,j}$ of the (i,j)-th impulse in the $(k_1,k_2,k_3,k_4)$-moire cluster is given by:

$$c_{i,j}=a_{ik_1-jk_2,ik_2+jk_1,ik_3-jk_4,ik_4+jk_3} \qquad (16)$$

and according to Eq. (4) we obtain:

$$c_{i,j}=a^{(1)}{}_{ik_1-jk_2}a^{(2)}{}_{ik_2+jk_1}a^{(3)}{}_{ik_3-jk_4}a^{(4)}{}_{ik_4+jk_3} \qquad (17)$$

But since we are dealing here with the superposition of two orthogonal layers (dot-screens) rather than with a superposition of four independent layers (gratings), each of the two 2D layers may be inseparable. Consequently, we should rather group the four amplitudes in Eq. (17) into pairs, so that each element in the expression corresponds to an impulse amplitude in the nailbed F(u,v) or in the nailbed G(u,v):

$$c_{ij}=a^{(f)}{}_{ik_1-jk_2,ik_2+jk_1}a^{(g)}{}_{ik_3-jk_4,ik_4+jk_3} \qquad (18)$$

This means that the amplitude $c_{i,j}$ of the (i,j)-th impulse in the $(k_1,k_2,k_3,k_4)$-moire cluster is the product of the amplitudes of its two generating impulses: the $(ik_1-jk_2,\ ik_2+jk_1)$-impulse of the nailbed F(u,v) and the $(ik_3-jk_4,\ ik_4+jk_3)$-impulse of the nailbed G(u,v). This can be interpreted more illustratively in the following way:

Let us call "the $(k_1,k_2)$-subnailbed of the nailbed F(u,v)" the partial nailbed of F(u,v) whose fundamental impulses are the $(k_1,k_2)$- and the $(-k_2,k_1)$-impulses of F(u,v); its general (i,j-impulse is the $i(k_1,k_2)+j(-k_2,k_1)=(ik_1-jk_2,\ ik_2+jk_1)$-impulse of F(u,v). Similarly, let the $(k_3,k_4)$-subnailbed of the nailbed G(u,v) be the partial nailbed of G(u,v) whose fundamental impulses are the $(k_3,k_4)$- and the $(-k_4,k_3)$-impulses of G(u,v); its general (i,j)-impulse is the $(ik_3-jk_4,\ ik_4+jk_3)$-impulse of G(u,v). It therefore follows from Eq. (18) that the amplitude of the (i,j)-impulse of the nailbed of the $(k_1,k_2,k_3,k_4)$-moire in the spectrum-convolution is the product of the (i,j)-impulse of the $(k_1,k_2)$-subnailbed of F(u,v) and the (i,j)-impulse of the $(k_3,k_4)$-subnailbed of G(u,v). This means that:

Result 3: (2D generalization of Result 1): The impulse amplitudes of the $(k_1,k_2,k_3,k_4)$-moire cluster in the spectrum-convolution are the term-by-term product of the $(k_1,k_2)$-subnailbed of F(u,v) and the $(k_3,k_4)$-subnailbed of G(u,v).

For example, in the case of the simplest first-order moire between the dot-screen f(x,y) and g(x,y), the (1,0,−1 ,0)-moire (see FIG. 2C), the amplitudes of the moire-cluster impulses in the spectrum-convolution are given by: $c_{i,j}=a^{(f)}{}_{i,j}a^{(g)}{}_{-i,-j}$. This means that in this case the moire-cluster is simply a term-by-term product of the nailbeds F(u,v) and G(−u,−v) of the original images f(x,y) and g(−x,−y). For the second-order (1,2,−2,−1)-moire (see FIG. 2B) the amplitudes of the moire-cluster impulses are: $c_{i,j}=a^{(f)}{}_{i-2j,2i+j}a^{(g)}{}_{-2i+j,-i-2j}$.

Now, since we also know the exact locations of the impulses of the moire-cluster (according to Eq. (14)), the spectrum of the isolated moire in question is fully determined, and given analytically by:

$$M_{k_1,k_2,k_3,k_4}(u,v)=\sum_{i=-\infty}^{\infty}\sum_{j=-\infty}^{\infty}c_{i,j}\delta_{ia+jb}(u,v) \tag{19}$$

where $\delta_f(u,v)$ denotes an impulse located at the frequency-vector f in the spectrum. Therefore, we can reconstruct the intensity profile of the moire, back in the image domain, by formally taking the inverse Fourier transform of the isolated moire cluster. Practically, this can be done either by interpreting the moire cluster as a 2D Fourier series, and summing up the corresponding sinusoidal functions (up to the desired precision); or, more efficiently, by approximating the continuous inverse Fourier transform of the isolated moire-cluster by means of the inverse 2D discrete Fourier transform (using FFT).

As in the case of grating superposition, the spectral domain term-by-term multiplication of the moire-clusters can be interpreted directly in the image domain by means of the 2D version of the T-convolution theorem:

2D T-convolution theorem: Let f(x,y) and g(x,y) be doubly periodic functions of period $T_x$, $T_y$ integrable on a one-period interval $(0\leqq x\leqq T_x, 0\leqq y\leqq T_y)$, and let $\{F_{m,n}\}$ and $\{G_{m,n}\}$ (for m,n=0,±1,±2, . . . ) be their 2D Fourier series coefficients. Then the function:

$$h(x,y)=\frac{1}{T_xT_y}\iint_{T_xT_y} f(x-x',y-y')g(x',y')dx'dy' \tag{20}$$

(where $\iint_{T_xT_y}$ means integration over a one-period interval), which is called "the T-convolution off and g" and denoted by "f**g," is also doubly periodic with the same periods $T_x$, $T_y$ and has Fourier series coefficients $\{H_{m,n}\}$ given by: $H_{m,n}=F_{m,n}G_{m,n}$ for all integers m,n.

According to this theorem we have the following result, which is the generalization of Result 2 to the general 2D case:

Result 4: The intensity profile of the $(k_1,k_2,k_3,k_4)$-moire in the superposition of f(x,y) and g(x,y) is a T-convolution of the (normalized) images belonging to the $(k_1,k_2)$-subnailbed of F(u,v) and the $(k_3,k_4)$-subnailbed of G(u,v). Note that, before applying the T-convolution theorem, the images must be normalized by stretching and rotation transformations, to fit the actual period and angle of the moire, as determined by Eq. (3) (or by the lattice $L_3(u,v)$ of the $(k_1,k_2,k_3,k_4)$-moire, which is spanned by the fundamental vectors a and b). As shown in Appendix A in "Amidror94," normalizing the periodic images by stretching and rotation does not affect their impulse amplitudes in the spectrum, but only the impulse locations.

These results can be easily generalized to any $(k_1, \ldots, k_m)$-moire between any number of superposed images by a simple, straightforward extension of this procedure.

A preferred case: the (1,0,−1,0)-moire

A preferred moire for the present invention relates to the special case of the (1,0,−1,0)-moire. A (1,0,−1,0)-moire becomes visible in the superposition of two dot-screens when both dot-screens have identical or almost identical frequencies and an angle difference $\alpha$ which is close to 0 degrees (this is illustrated, in the spectral domain, by FIG. 2C). As shown in the example following Result 3, in the special case of the (1,0,−1,0)-moire the impulse amplitudes of the moire-cluster are simply a term-by-term product of the nailbeds F(u,v) and G(−u,−v) themselves: $C_{i,j}=a^{(f)}{}_{i,j}a^{(g)}{}_{-i,-j}$. Since the impulse locations of this moire-cluster are also known, according to Eq. (3), we can obtain the intensity profile of the (1,0,−1,0)-moire by extracting this moire-cluster from the full spectrum-convolution, and taking its inverse Fourier transform.

However, according to Result 4, the intensity profile of the (1,0,−1,0)-moire can also be interpreted directly in the image domain: in this special case the moire intensity profile is simply a T-convolution of the original images f(x,y) and g(−x,−y) (after undergoing the necessary stretching and rotations to make their periods, or their supporting lattices in the spectrum, coincide).

Figure 3:
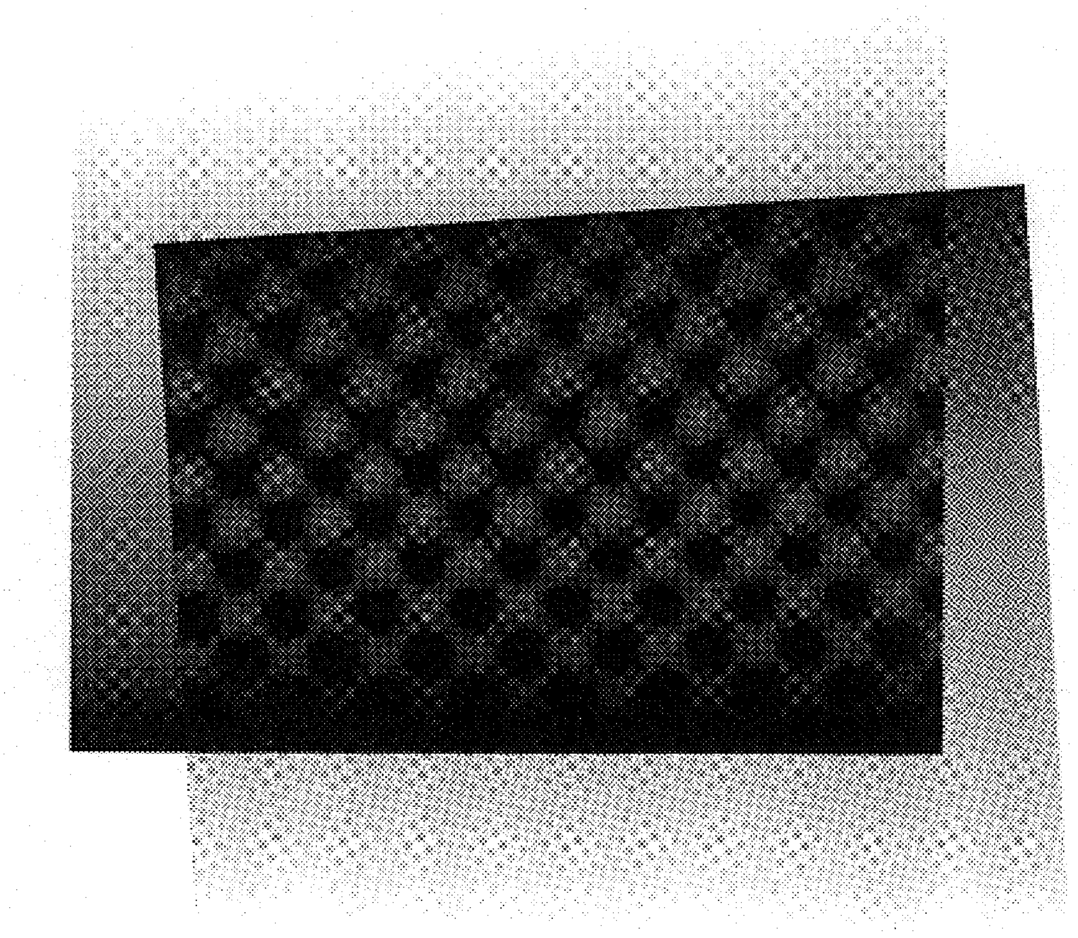
FIG. 3 shows the moire intensity profiles obtained in the superposition of a dot-screen comprising circular black dots of varying sizes and a dot-screen comprising triangular black dots of varying sizes.
Figure 4:
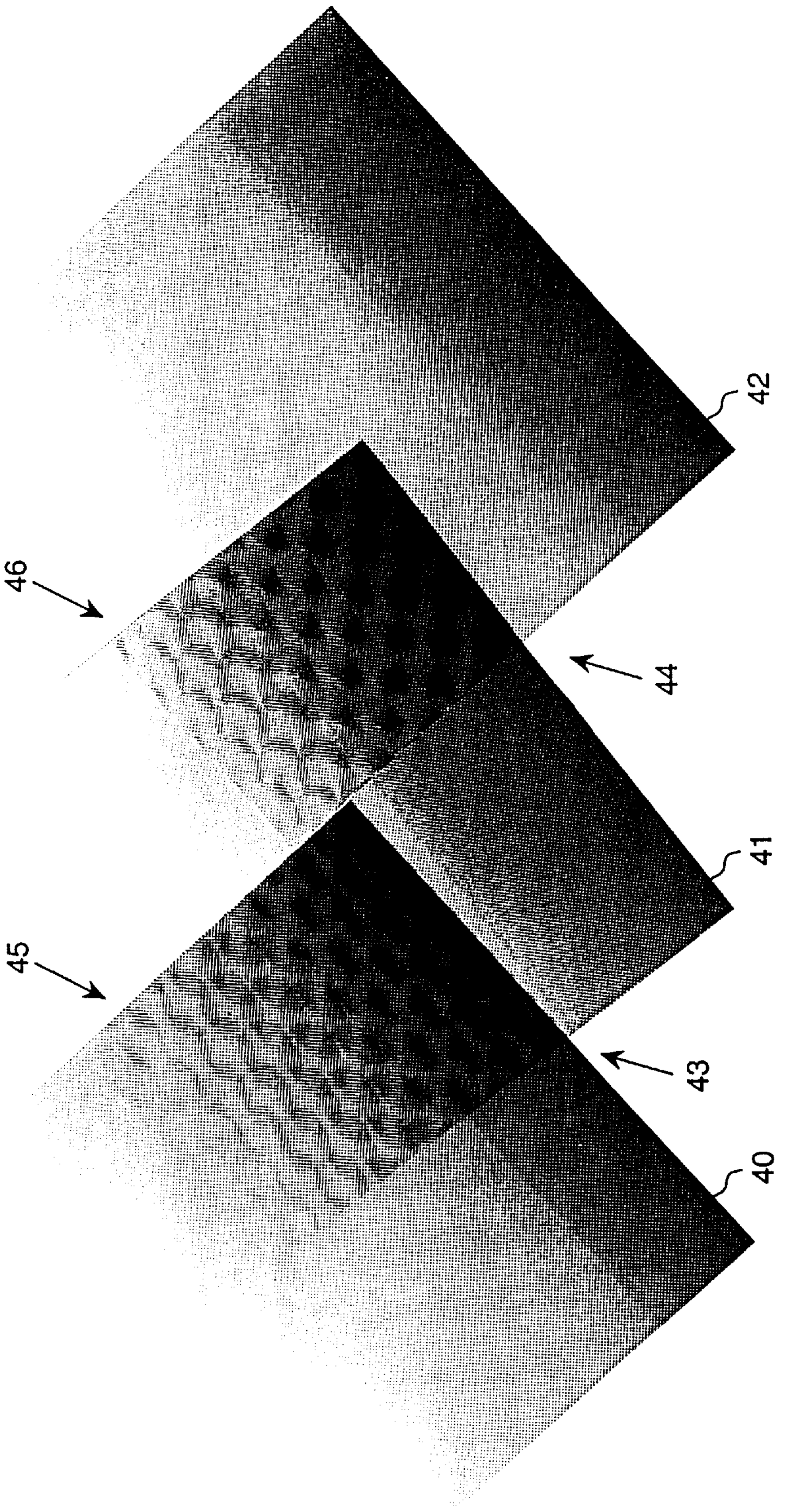
FIG. 4 shows the moire intensity profiles obtained in the superposition of two dot-screens comprising circular black dots of varying sizes and a dot-screen comprising black dots of varying sizes having the shape of the digit "1"

Let us see now how T-convolution fully explains the moire intensity profile forms and the striking visual effects observed in superpositions of dot-screens with any chosen dot shapes, such as in FIG. 3 or FIG. 4. In these figures the moire is obtained by superposing two dot-screens having identical frequencies, with just a small angle difference a; this implies that in this case we are dealing, indeed, with a (1,0,−1,0)-moire. In the example of FIG. 4, dot-screen 41 consists of black "1"-shaped dots, and dot-screens 40 and 41 consist of black circular dot shapes. Each of the dot-screens 40, 41 and 42 consists of gradually increasing dots, with identical frequencies, and the superposition angle between the dot-screens is 4 degrees.

Case 1: As can be seen in FIG. 4, the form of the moire intensity profiles in the superposition is most clear-cut and striking where one of the two dot-screens is relatively dark (see 43 and 44 in FIG. 4). This happens because the dark screen includes only tiny white dots, which play in the T-convolution the role of very narrow pulses with amplitude 1. As shown in FIG. SA, the T-convolution of such narrow pulses 50 (from one dot-screen) and dots 51 of any chosen shape (from a second dot-screen) gives dots 52 of the same chosen shape, in which the zero values remain at zero, the 1 values are scaled down to the value A (the volume or the area of the narrow white pulse divided by the total cell area, $T_x \cdot T_y$), and the sharp step transitions are replaced by slightly softer ramps. This means that the dot shape received in the normalized moire-period is practically identical to the dot shape of the second screen, except that its white areas turn darker. However, this normalized moire-period is stretched back into the real size of the moire-period $T_M$, as it is determined by Eqs. (5) and (6) (or in our case, according to Eq. (8), by the angle difference a alone, since the screen frequencies are fixed; note that the moire period becomes larger as the angle α tends to 0 degrees). This means that the moire intensity profile form in this case is essentially a magnified version of the second screen, where the magnification rate is controlled only by the angle α. This magnification property of the moire effect is used in the present invention as a "virtual microscope" for visualizing the detailed structure of the dot-screen printed on the document.

Case 2: A related effect occurs in the superposition where one of the two dot-screens contains tiny black dots (see 45 and 46 in FIG. 4). Tiny black dots on a white background can be interpreted as "inversed" pulses of 0-amplitude on a constant background of amplitude 1. As shown in FIG. 5B, the T-convolution of such inversed pulses 53 (from one dot-screen) and dots 54 of any chosen shape (from a second dot-screen) gives dots 55 of the same chosen shape, where the zero values are replaced by the value B (the volume under a one-period cell of the second screen divided by $T_x \cdot T_y$)) and the 1 values are replaced by the value B−A (where A is the volume of the "hole" of the narrow black pulse divided by $T_x \cdot T_y$). This means that the dot shape of the normalized moire-period is similar to the dot shape of the second screen, except that it appears in inverse video and with slightly softer ramps. And indeed, as it can be seen in FIG. 4, wherever one of the screens in the superposition contains tiny black dots, the moire intensity profile appears to be a magnified version of the second screen, but this time in inverse video.

Case 3: When none of the two superposed screens contains tiny dots (either white or black), the intensity profile form of the resulting moire is still a magnified version of the T-convolution of the two original screens. This T-convolution gives, as before, some kind of blending between the two original dot shapes, but this time the resulting shape has a rather blurred or smoothed appearance.

The orientation of the (1,0,−1,0)-moire intensity profiles

Although the (1,0,−1,0)-moire intensity profiles inherit the shapes of the original screen dots, they do not inherit their orientation. Rather than having the same direction as the dots of the original screens (or an intermediate orientation), the moire intensity profiles appear in a perpendicular direction. This fact is explained as follows:

As we have seen, the orientation of the moire is determined by the location of the fundamental impulses of the moire-cluster in the spectrum, i.e. by the location of the basis vectors a and b (Eq. (13)). In the case of the (1,0,−1,0)-moire these vectors are reduced to:

$$a = f_1 - f_3 \qquad (21)$$

$$b = f_2 - f_4$$

And in fact, as it can be seen in FIG. 2C, when the two original dot-screens have the same frequency, these basis vectors are rotated by about 90 degrees from the directions of the frequency vectors $f_i$ of the two original dot-screens. This means that the (1,0,−1,0)-moire cluster (and the moire intensity profile it generates in the image domain) are rotated by about 90 degrees relative to the original dot-screens f(x,y) and g(x,y). Note that the precise period and angle of this moire can be found by formulas (8) which were derived for the (1,−1)-moire between two line-gratings with identical periods T and angle difference of α.

Obviously, the fact that the direction of the moire intensity profile is almost perpendicular to the direction of the original dot-screens is a property of the (1,0,−1,0)-moire between two dot-screens having identical frequencies; in other cases the angle of the moire may be different. In all cases the moire angle can be found by Eqs. (5) and (6).

Further details about more complex moires and moires of higher order are disclosed in detail in "Amidror94". In general, in order to obtain a $(k_1,k_2,k_3,k_4)$-moire in the superposition of two dot-screens, the frequencies $f_i$ and the angles $\theta_i$ of the two dot-screens have to be chosen in accordance with Eqs. (5) and (6), so that the frequency of the $(k_1,k_2,k_3,k_4)$-impulse is located close to the origin of the frequency spectrum, within the range of visible frequencies.

Authentication of documents using the intensity profile of moire patterns

The present invention concerns a new method for authenticating documents, which is based on the intensity profile of moire patterns. In one embodiment of the present invention, the moire intensity profiles can be visualized by superposing the basic screen and the master screen which both appear on two different areas of the same document (banknote, etc.). In a second embodiment of the present invention, only the basic screen appears on the document itself, and the master screen is superposed on it by the human operator or the apparatus which visually or optically validates the authenticity of the document. In a third embodiment of this invention, the basic screen appears on the document itself, and the master screen which is used by the human operator or by the apparatus is a microlens array. An advantage of this third embodiment is that it applies equally well to both transparent support (where the moire is observed by transmittance) and to opaque support (where the moire is observed by reflection). Since the document may be printed on traditional opaque support (such as white paper), this embodiment offers high security without requiring additional costs in the document production.

The method for authenticating documents comprises the steps of:

a) creating on a document a basic screen with at least one basic screen dot shape;

b) creating a master screen with a master screen dot shape (where the master screen may be either a dot-screen or a microlens array);

c) superposing the master screen and the basic screen, thereby producing a moire intensity profile;

d) comparing said moire intensity profile with a prestored moire intensity profile, and depending on the result of the comparison, accepting or rejecting the document.

In accordance with the third embodiment of this invention, the master screen may also be made of a microlens array. Microlens arrays are composed of microlenses arranged for example on a square or a rectangular grid with a chosen frequency (see, for example, "Microlens arrays" by Hutley et al., Physics World, July 1991, pp. 27–32). They have the particularity of enlarging on each grid element only a very small region of the underlying source image, and therefore they behave in a similar manner as screens comprising small white dots, having the same frequency. However, since the substrate between neighboring microlenses in the microlens array is transparent and not black, microlens arrays have the advange of letting the incident light pass through the array. They can therefore be used for producing moire intensity profiles either by reflection or by transmission, and the document including the basic screen may be printed on any support, opaque or transparent.

The comparison in step d) above can be done either by human biosystems (a human eye and brain), or by means of an apparatus described later in the present disclosure. In the latter case, comparing the moire intensity profile with a prestored moire intensity profile can be made by matching techniques, to which a reference is made in the section "Computer-based authentication of documents by matching prestored and acquired moire intensity profiles" below.

The prestored moire intensity profile (also called: "reference moire intensity profile") can be obtained either by image acquisition, for example by a CCD camera, of the superposition of a sample basic screen and a master screen, or it can be obtained by precalculation. The precalculation can be done, as explained earlier in the present disclosure, either in the image domain (by means of a normalized T-convolution of the basic screen and the master screen), or in the spectral domain (by extracting from the convolution of the frequency spectrum of the basic screen and the frequency spectrum of the master screen those impulses describing the $(k_1,k_2,k_3,k_4)$-moire, and by applying to said impulses an inverse Fourier transform). In the case where a microlens array is used as a master screen, the frequency spectrum of the microlens array is considered to be the frequency spectrum of the equivalent dot-screen, having the same frequency and orientation as the microlens array.

In the case where the basic screen is formed as a part of a halftoned image printed on the document, the basic screen will not be distinguishable by the naked eye from other areas on the document. However, when authenticating the document according to the present invention, the moire intensity profile will become immediatly apparent Any attempt to falsify a document produced in accordance with the present invention by photocopying, by means of a desk-top publishing system, by a photographic process, or by any other counterfeiting method, be it digital or analog, will inevitably influence (even if slightly) the size or the shape of the tiny screen dots of the basic (or master) screens comprised in the document (for example, due to dot-gain or ink-propagation, as is well known in the art). But since moire effects between superposed dot-screens are very sensitive to any microscopic variations in the screened layers, this makes any document protected according to the present invention practically impossible to counterfeit, and serves as a means to distinguish between a real document and a falsified one. Furthermore, unlike previously known moire-based anticounterfeiting methods, which are only effective against counterfeiting by digital equipment (digital scanners or photocopiers), the present invention is equally effective in the cases of analog or digital equipment The invention is elucidated by means of the Examples below which are provided in illustrative and non-limiting manner.

EXAMPLE 1

Basic Screen and Master Screen on Same Document

Figure 5A:
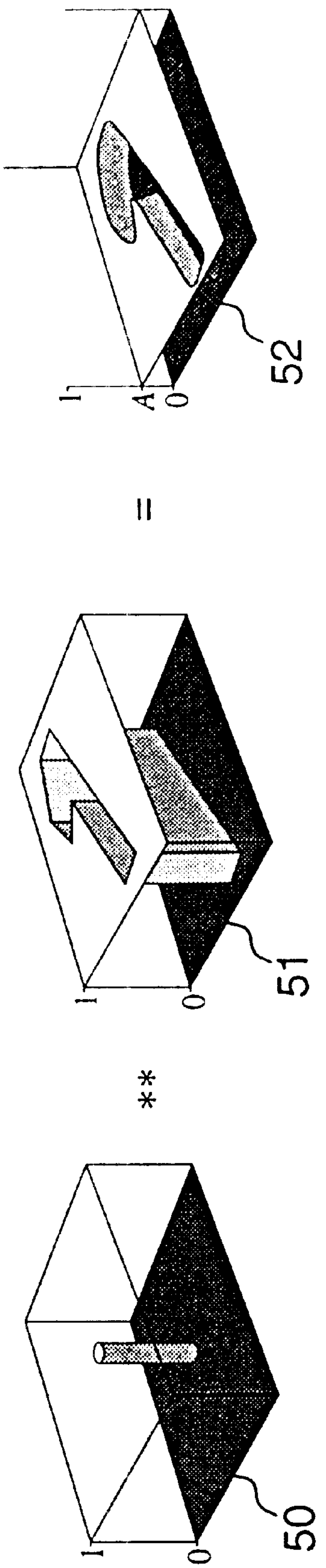
FIG. 5A illustrates how the T-convolution of tiny white dots from one dot-screen with dots of a chosen shape from a second dot-screen gives moire intensity profiles of essentially the same chosen shape.
Figure 5B:
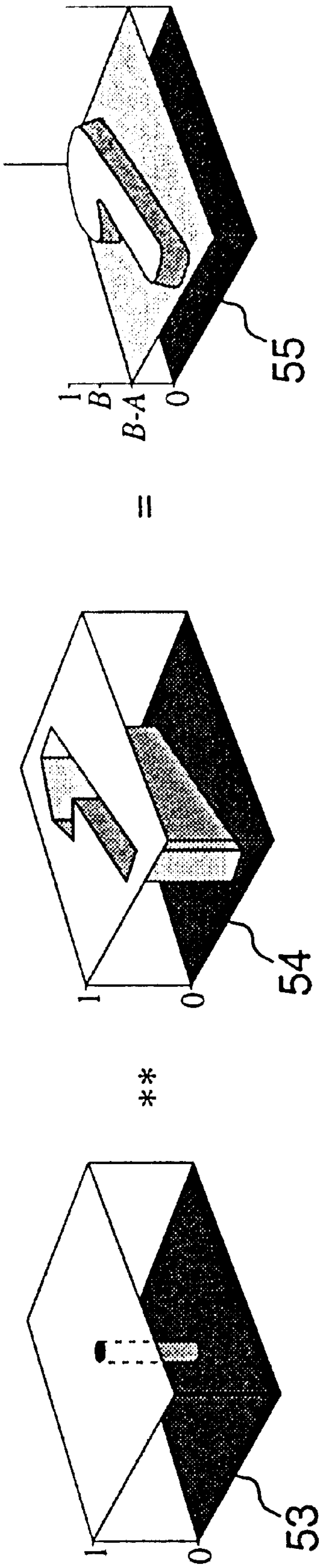
FIG. 5B illustrates how the T-convolution of tiny black dots from one dot-screen with dots of a chosen shape from a second dot-screen gives moire intensity profiles of essentially the same chosen shape, but in inverse video.

Consider as a first example a banknote comprising a basic screen with a basic screen dot shape of the digit "1" (like 51 in FIG. 5A). Such a dot-screen can either be generated according to state of the art halftoning methods such as the ordered dither methods described in "Digital Halftoning" by R. Ulichney, 1988 (Chapter 5), or by contour based screening methods as disclosed in co-pending U.S. patent application Ser. No. 08/410,767 filed Mar. 27, 1995 (Ostromoukhov, Hersch). It should be noted that the term "dither matrix" used in the present disclosure is equivalent to the term "threshold array" used in "Digital Halftoning" by Ulichney.

In a different area of the banknote a master screen is printed, for example, with a master screen dot shape of small white dots (like 50 in FIG. 5A), giving a dark intensity level. The banknote is printed on a transparent support.

In this example both the basic screen and the master screen are produced with the same dot frequency, and the generated moire is a (1,0,−1 ,0)-moire. In order that the produced moire intensity profile shapes be upright (90 degrees orientation), the screen dot shapes of the basic and the master screens are required to have an orientation close to 180 degrees (or 0 degrees), according to the explanation given in the section "The orientation of the (1,0,−1,0)-moire intensity profiles" above.

Figure 6:
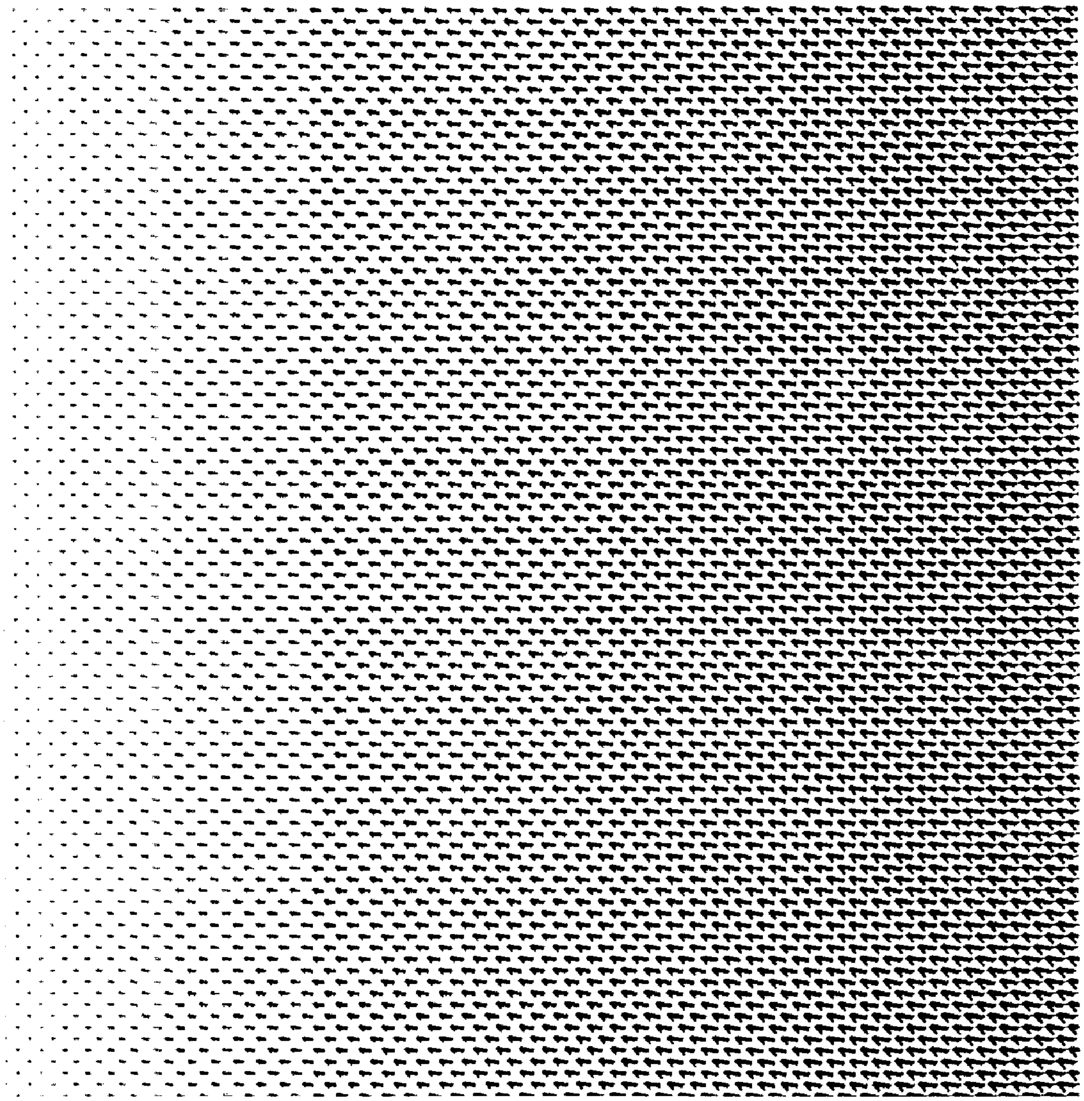
FIG. 6 shows a basic screen comprising black dots of varying sizes having the shape of the digit "1"
Figure 7A:
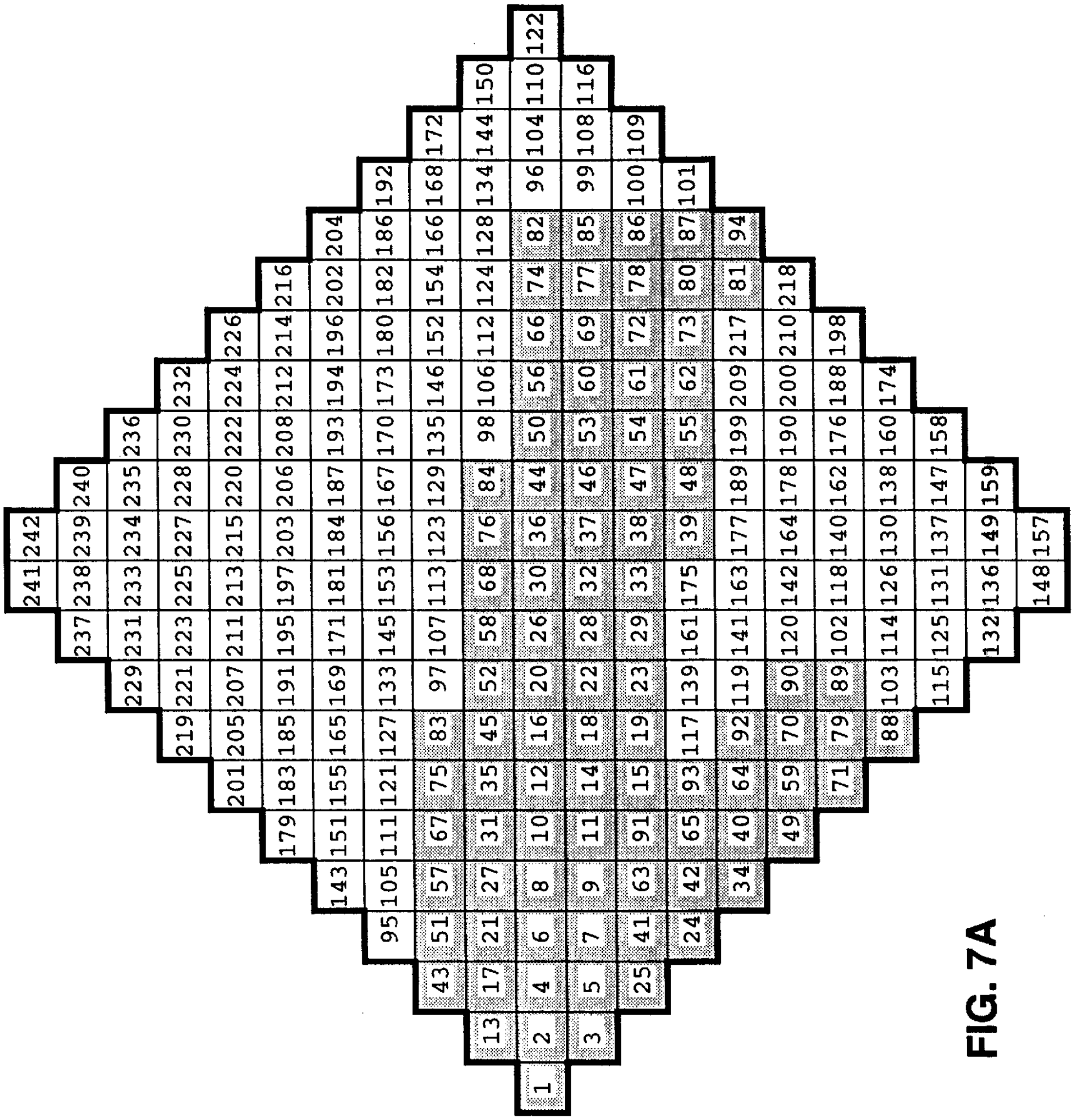
FIG. 7A shows the dither matrix used to generate the basic screen of FIG. 6.
Figure 7B:
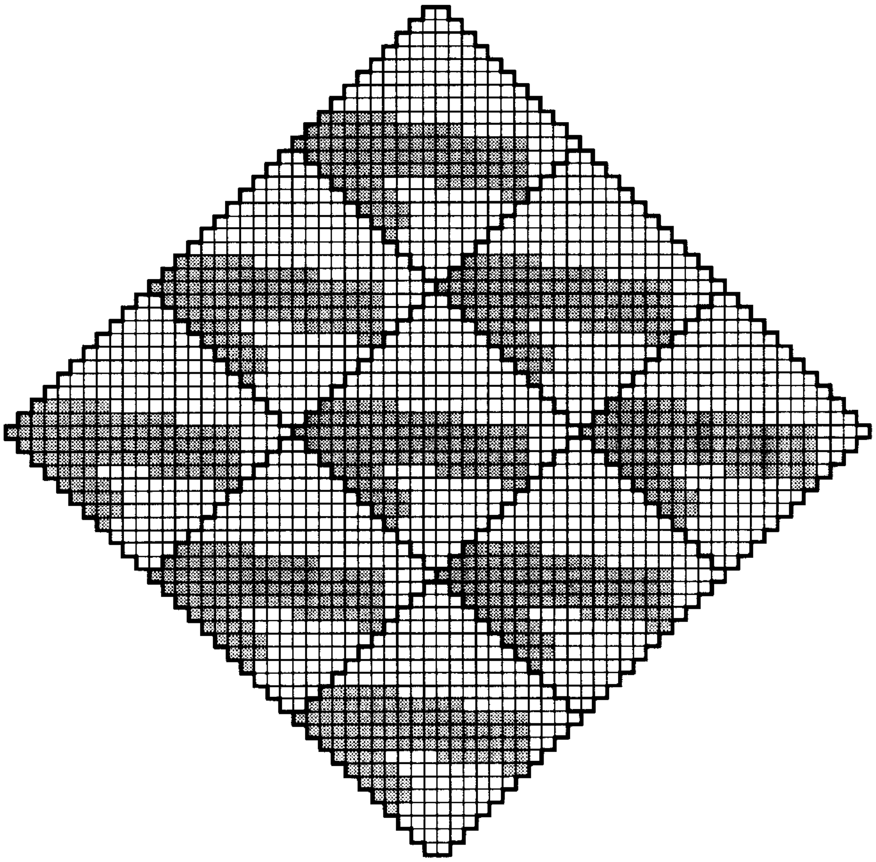
FIG. 7B is a greatly magnified view of a small portion of the basic screen of FIG. 6, showing how it is generated by the dither matrix of FIG. 7A.
Figure 8:
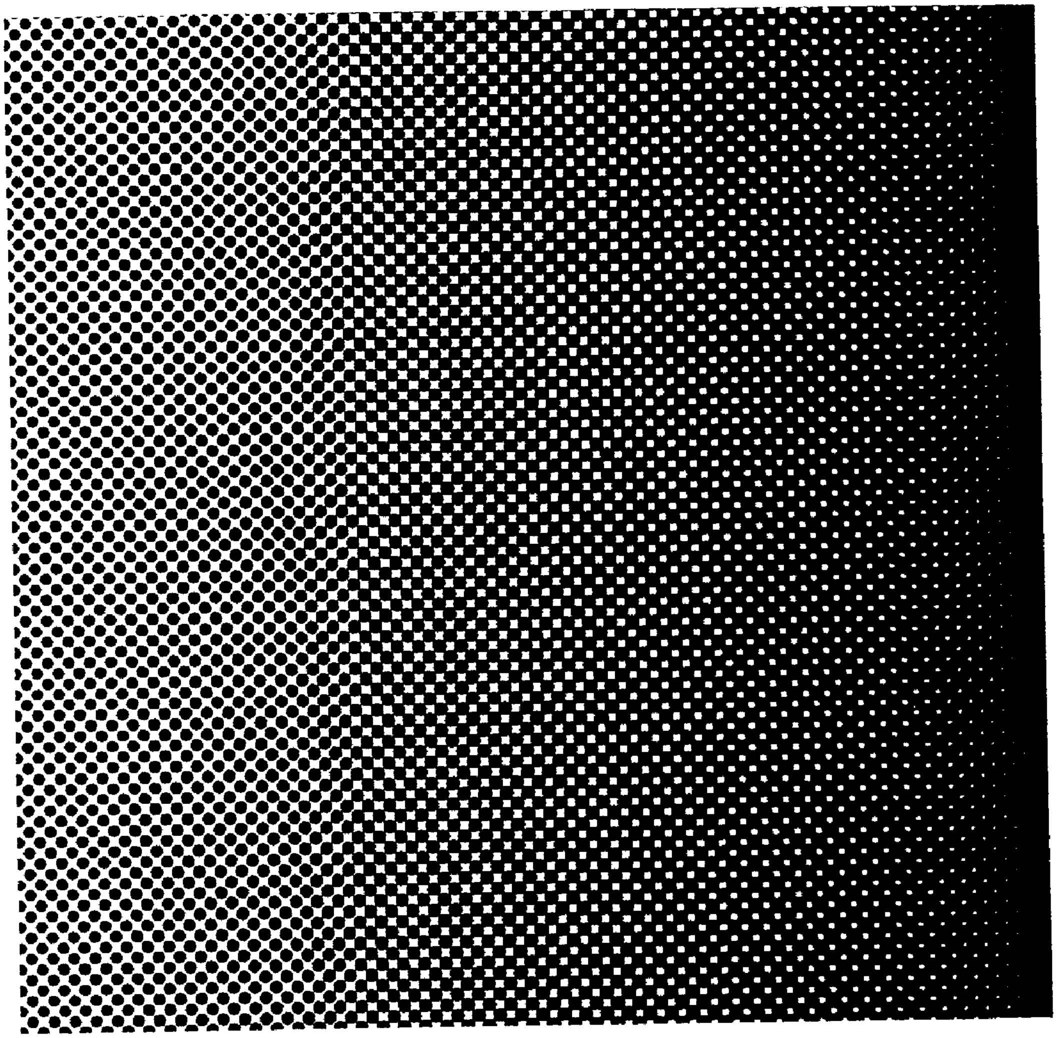
FIG. 8 shows a master screen comprising small white dots of varying sizes.
Figure 9A:
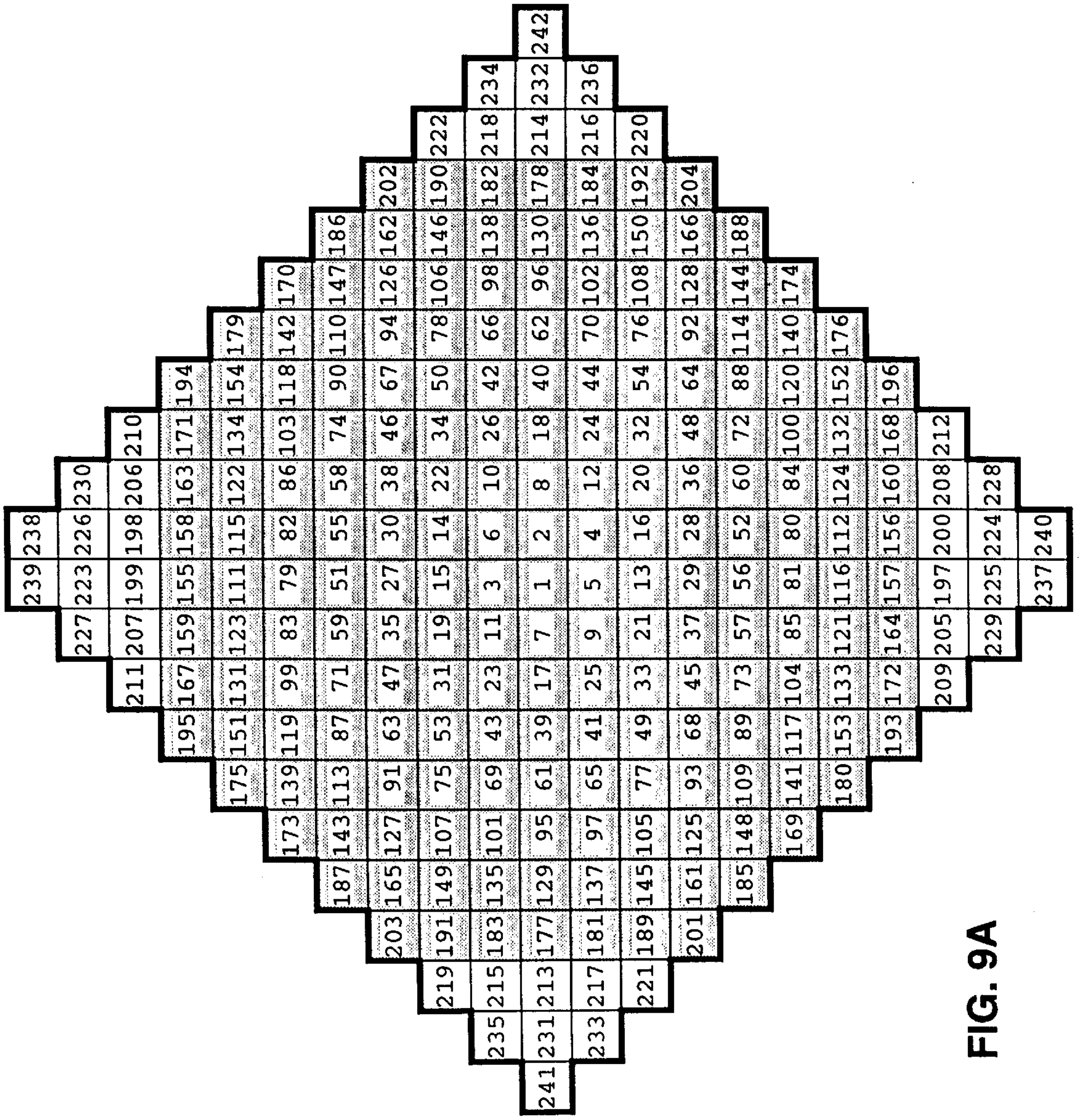
FIG. 9A shows the dither matrix used to generate the master screen of FIG. 8.
Figure 9B:
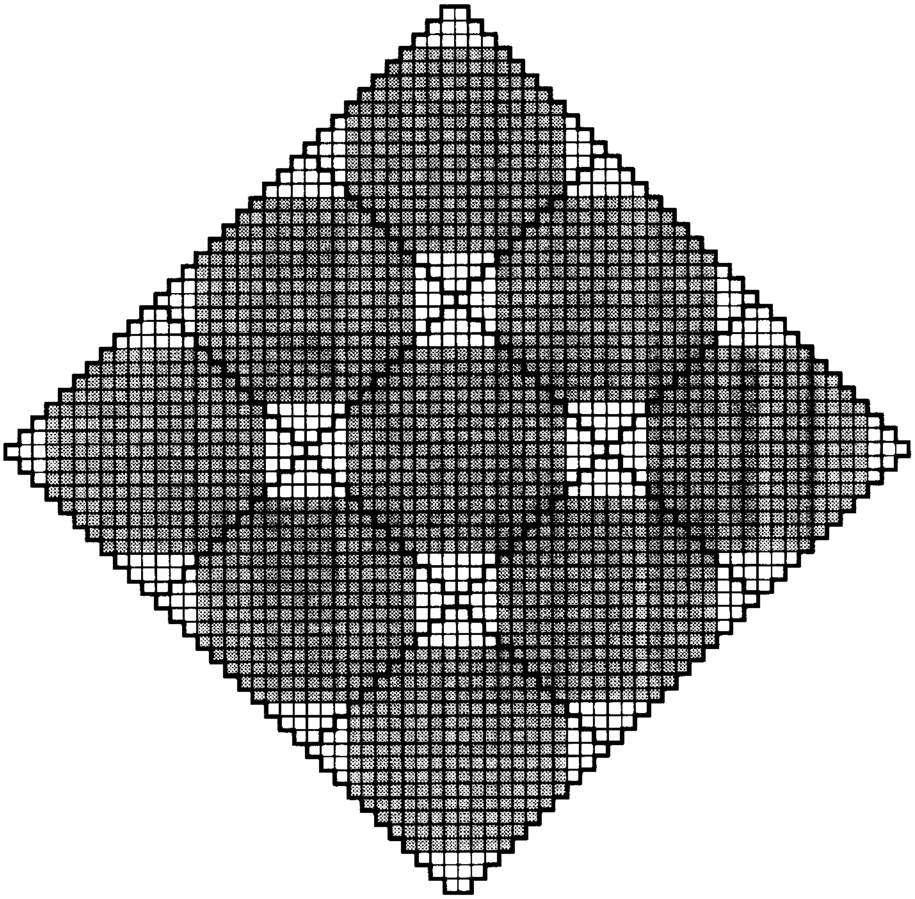
FIG. 9B is a greatly magnified view of a small portion of the master screen of FIG. 8, showing how it is generated by the dither matrix of FIG. 9A.

FIG. 6 shows an example of a basic screen with a basic screen dot shape of the digit "1", which is generated with varying intensity levels using the dither matrix shown in FIG. 7A. FIG. 7B shows a magnified view of a small portion of this basic screen, and how it is built by the dither matrix of FIG. 7A. FIG. 8 shows an example of a master screen which is generated with the dither matrix shown in FIG. 9A (with darker intensity levels than the basic screen, in order to obtain small white dots). FIG. 9B shows a magnified view of a small portion of this master screen, and how it is built by the dither matrix of FIG. 9A. Note that FIG. 6 and FIG. 8 are reproduced here on a 300 dot-per-inch printer in order to show the screen details; on the real banknote the screens will normally be reproduced by a system whose resolution is at least 1270 or 2540 dots-per-inch. The moire intensity profile which is obtained when the basic screen and the master screen are superposed has the form of the digit "1", as shown by 43 in FIG. 4.

EXAMPLE 2

Basic Screen on Document and Master Screen on Separate Support

As an alternative to Example 1, a banknote may contain a basic screen, which is produced by screen dots of a chosen size and shape (or possibly, by screen dots of varying size and shape, being incorporated in a halftoned image). The banknote is printed on a transparent support. The master screen may be identical to the master screen described in Example 1, but it is not printed on the banknote itself but rather on a separate transparent support, and the banknote can be authenticated by superposing the basic screen of the banknote with the separate master screen. For example, the superposition moire may be visualized by laying the banknote on the master screen, which may be fixed on a transparent sheet of plastic and attached on the top of a box containing a diffuse light source.

EXAMPLE 3

Basic Screen on Document and Master Screen Made of a Microlens Array

In the present example, the master screen has the same frequency as in Example 2, but it is made of a microlens array. The basic screen is as in Example 2, but the document is printed on a reflective (opaque) support. In the case where the basic screen is formed as a part of a halftoned image printed on the document, the basic screen will not be distinguishable by the naked eye from other areas on the document. However, when authenticated under the microlens array, the moire intensity profile will become immediatly apparent. Since the printing of the basic screen on the document is incorporated in the standard printing process, and since the document may be printed on traditional opaque support (such as white paper), this embodiment offers high security without requiring additional costs in the document production.

The multichromatic case

As previously mentioned, the present invention is not limited only to the monochromatic case; on the contrary, it may largely benefit from the use of different colors in any of the dot-screens being used.

One way of using colored dot-screens in the present invention is similar to the standard multichromatic printing technique, where several (usually three or four) dot-screens of different colors (usually: cyan, magenta, yellow and black) are superposed in order to generate a full-color image by halftoning. By way of example, if one of these colored dot-screens is used as a basic screen according to the present invention, the moire intensity profile that will be generated with a black-and-white master screen will closely approximate the color of the color basic screen. If several of the different colored dot-screens are used as basic screens according to the present invention, each of them will generate with a black-and-white master screen a moire intensity profile approximating the color of the basic screen in question.

Figure 14A:
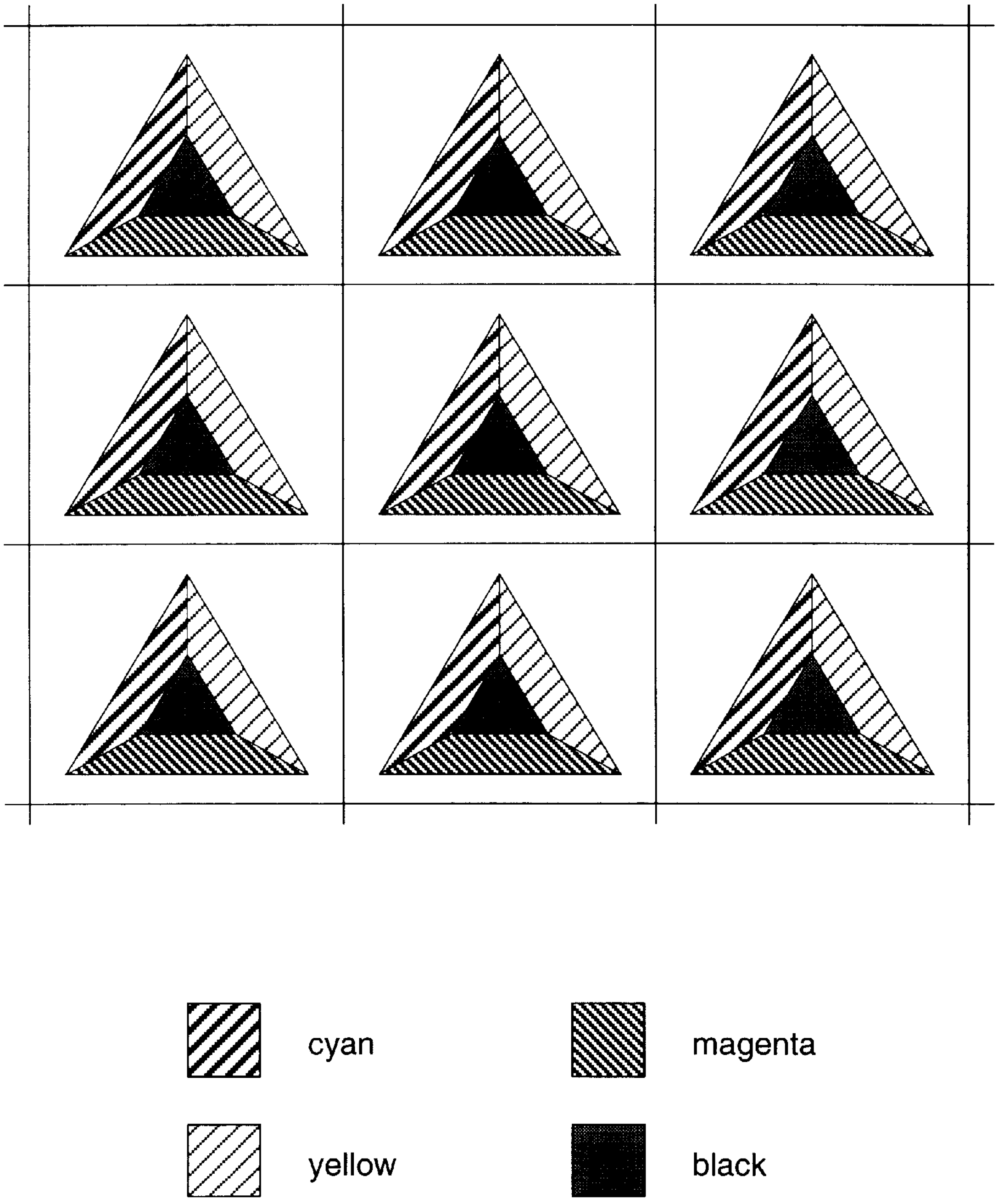
FIG. 14A is a schematic, magnified view of a small portion of a multicolor basic screen with triangular screen dots, where each of the screen dots is subdivided into three sub-elements of different colors.

Another possible way of using colored dot-screens in the present invention is by using a basic screen whose individual screen elements are composed of sub-elements of different colors. (Note that the term "screen element" is used hereinafter to indicate a full 2D period of the dot-screen; it refers both to the screen dot which appears within this 2D period and to the background area which fills the rest of the period). An example of such a basic screen is illustrated in FIG. 14A, in which each of the screen dots of the basic screen has a triangular shape, and is sub-divided into sub-elements of different colors, as indicated by the different hachures in FIG. 14A, where each type of hachure represents a different color (for example: cyan, magenta, yellow and black). When a black-and-white master screen is superposed on such a multichromatic basic screen, a similar multichromatic moire effect is obtained, where not only the shape of the moire profiles is determined by the screen elements of the basic screen but also their colors. For example, in the case of the basic screen shown in FIG. 14A, the moire profiles obtained will be triangular, and each of them will be sub-divided into colored zones like in FIG. 14A. An important advantage of this method as an anticounterfeiting means is gained from the extreme difficulty in printing perfectly juxtaposed sub-elements of the screen dots, due to the high precision it requires between the different colors in multi-pass color printing. Only the best high-performance security printing equipment which is used for printing security documents such as banknotes is capable of giving the required precision in the alignment (hereinafter: "registration") of the different colors. Registration errors which are unavoidable when counterfeiting the document on lower-performance equipment will cause small shifts between the different colored sub-elements of the basic screen elements; such registration errors will be largely magnified by the moire effect, and they will significantly corrupt the form and the color of the moire profiles obtained by the master screen.

Figure 14B:
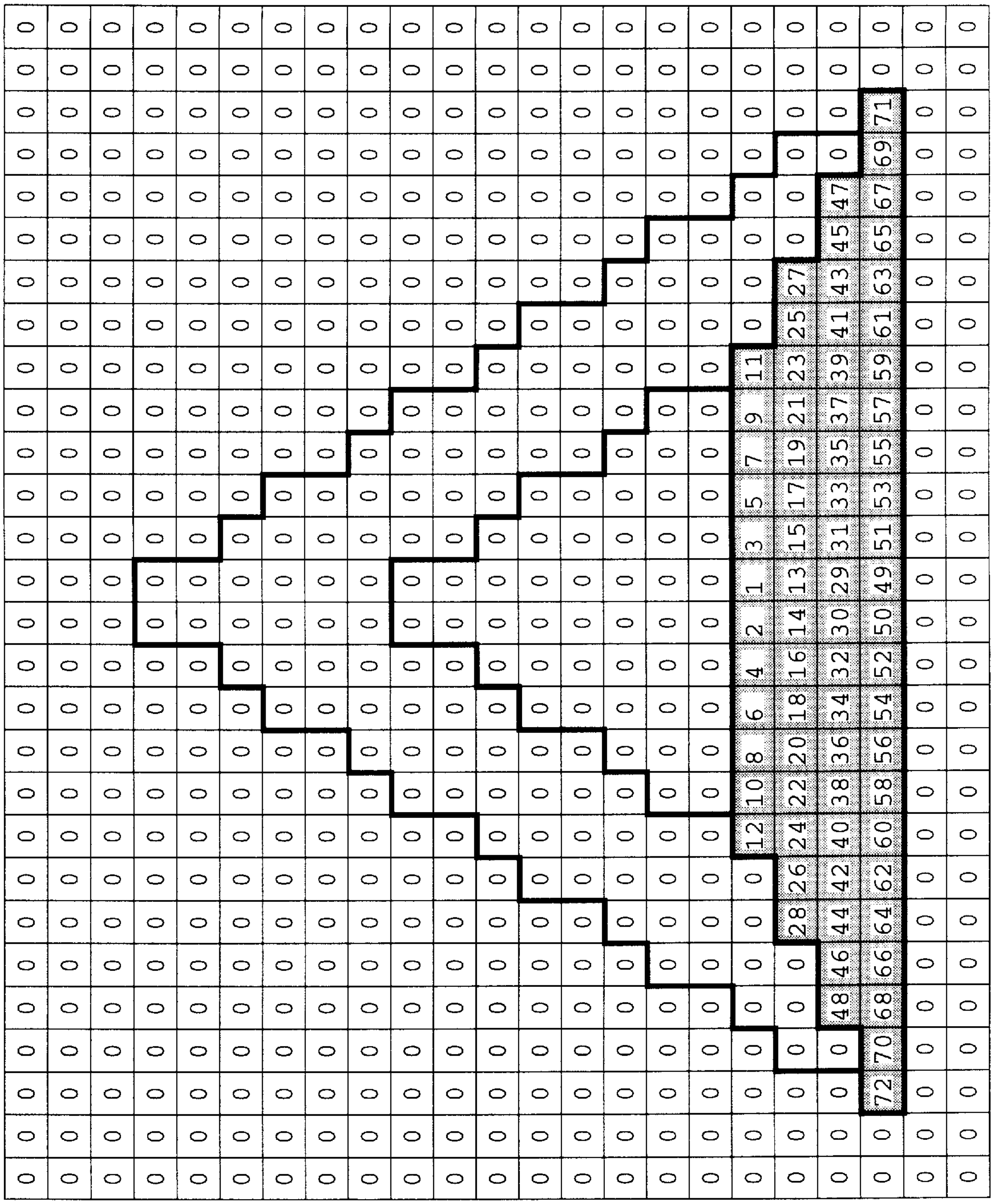
FIG. 14B shows the dither matrix used to generate the magenta part of the multichromatic basic screen of FIG. 14A.
Figure 14C:
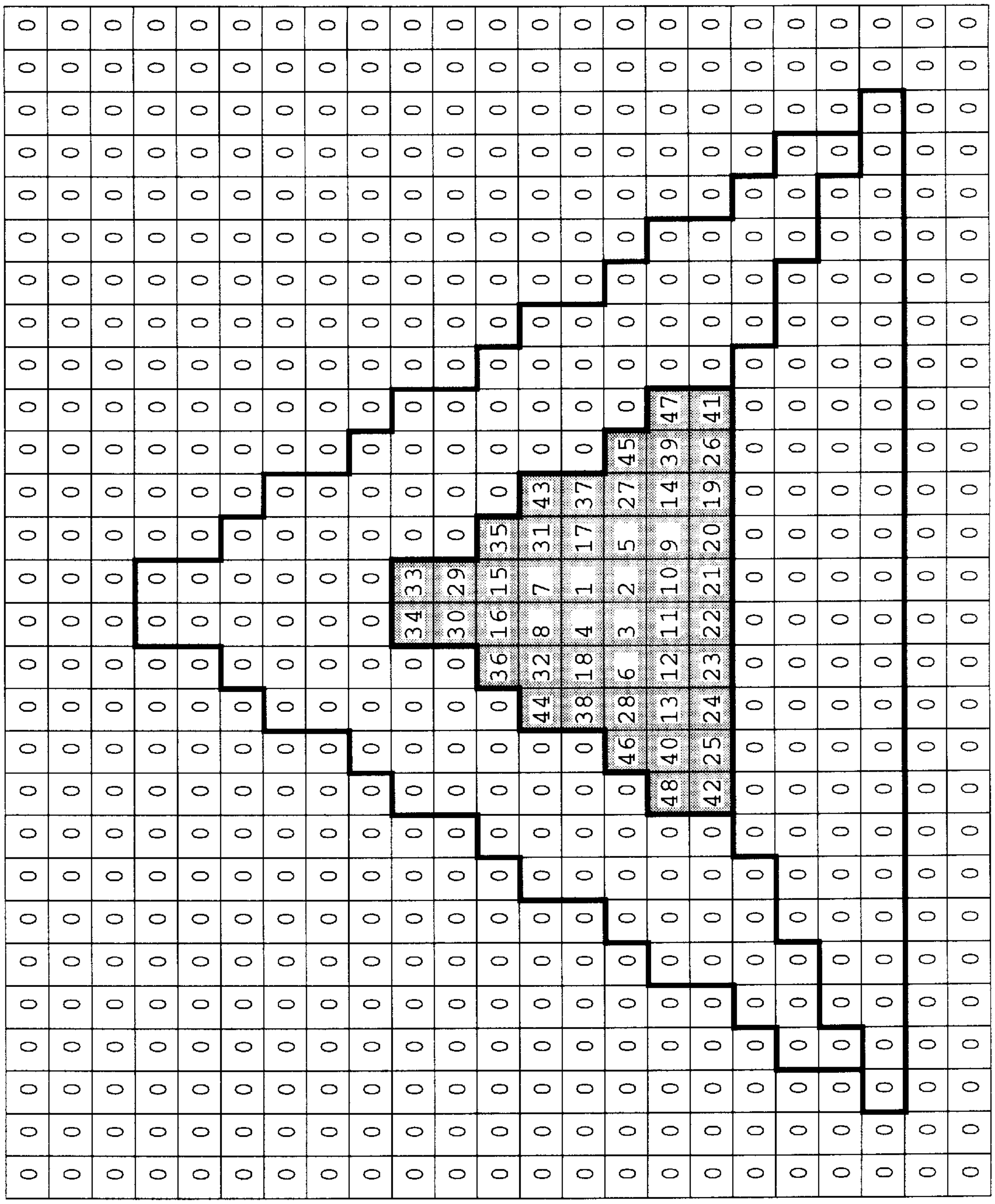
FIG. 14C shows the dither matrix used to generate the black part of the multichromatic basic screen of FIG. 14A.

In practice, a multichromatic basic screen like the one shown in FIG. 14A can be generated by the same method as that described in "Example 1" above, with one dither matrix for each of the colors of the multichromatic basic screen. In the example of FIG. 14A, each screen element is generated by four dither matrices: one for the cyan pixels, one for the magenta pixels, one for the yellow pixels, and finally, one for the black pixels. Each of these single-color dither matrices is built in the same way as described in "Example 1", where only the dither matrix elements of the single color in question are numbered, while all the other dither matrix elements of the other colors are masked out (set to zero). For example, FIG. 14B shows a possible dither matrix for generating the magenta part of the screen elements shown in FIG. 14A, and FIG. 14C shows a possible dither matrix for generating the black part of the screen elements of FIG. 14A.

Covert anticounterfeit and authentication means

While some anticounterfeit and authentication means are intended to be used by the general public ("overt" features), other means are meant to remain hidden, only detectable by the competent authorities or by automatic authentication devices ("covert" features). The present invention also lends itself particularly well to the latter case. In fact, a first step in this direction can be taken by incorporating the dot-screens which are printed on the document in accordance with the present disclosure within any halftoned image printed on the document (such as a portrait, landscape, or any decorative motif, which may be different from the motif generated by the moire effect in the superposition).

However, in cases where the present invention is to be used as a covert feature, it may be desirable that the document, even when inspected under a strong magnifying glass, should not reveal the information carried by the basic screen (i.e. the nature and the shapes of the moire intensity profiles which appear when the master screen is superposed).

This can be achieved by masking the information carried by the basic screen, in order to obtain a masked basic screen. A masked basic screen can be obtained in a variety of ways, which can be classified into several methods as follows:

(a) The masking layer method. In this method a masked basic screen is obtained by superposing a new layer with any geometric or decorative forms (such as a multitude of circles, triangles, letters, etc.) on top of the basic screen. For example, the masking of the basic screen can be carried out by superposition of circles placed at random positions, with radiuses varying randomly between a minimal predefined value and a maximal predefined value.

(b) The composite basic screen method. In this method the masked basic screen is a composite basic screen which is composed of two or more different dot-screens, each carrying its own information, that are superposed on each other.

(c) The perturbation patterns method. In this method a masked basic screen is obtained by altering the basic screen itself. This can be done by introduction of perturbation patterns into the basic screen by means of mathematical, statistical or logical Boolean operations. An example of this method is the introduction of any sort of statistical noise into the basic screen. The perturbation patterns can alter the original dither matrix used to generate the basic screen.

(d) Any combination of methods (a) (b) and (c).

As will become clear in the explanation below, if the new superposed masking layer (or respectively, the inserted perturbation) is non-periodic, or if it is periodic but it has a different period and/or orientation than the basic screen, this masking effect will not hamper the appearance of the moire intensity profiles when the master screen is superposed, but it will prevent the visualization of the information carried by the basic screen without using the master screen (for example, by a mere inspection of the document under a microscope).

Furthermore, since masked basic screens are generated by a computer program, they can be made so complex that even professionals in the graphic arts cannot re-engineer them without having the original computing programs specially developed for creating them. Masking of information carried by a basic screen will now be exemplified by means of three techniques described below, which are provided in illustrative and non-limiting manner. Techniques 1 and 2 are provided as examples of a composite basic screen method, and technique 3 is given as an example of a perturbation patterns method.

Technique 1: The composite basic screen method with a single master screen

This technique, which illustrates the composite basic screen method, will be most clearly understood by means of the following case. Assume we are given two regular dot-screens with identical frequencies (a dot-screen is called "regular" when its two main directions are perpendicular and have the same frequency). These dot-screens are superposed, preferably at such an angle difference that no moire is visible in their superposition (in the case of two regular dot-screens, the angle difference may be, for example, about 45 degrees). Assume, now, that each of the two superposed dot-screens is made of a non-trivial screen dot shape (preferably, a different dot shape for each of the dot-screens). This is illustrated in FIGS. 11A and 11B, in which one of the dot-screens has a screen dot shape of "EPFL/LSP" (110), while the other dot-screen has a screen dot shape of "USA/$50" (111). When these two dot-screens are superposed with said angle difference, their superposed screen dots intersect each other, generating a complex and intricate microstructure. When looking under a magnifying glass or a microscope the microstructure of this superposition looks scrambled and unintelligible, as illustrated in FIG. 11C. Such a superposed screen will be called hereinafter "a composite screen", and a basic screen which consists of a composite screen will be called "a composite basic screen".

Now, since both of the dot-screens which make the composite basic screen have identical frequencies and they only differ in their orientations (and in their screen dot shapes), the same master screen can be used for both screens. When this master screen is superposed on top of the composite basic screen in an angle close to the orientation of the first screen, a moire intensity profile is generated between the first screen of the composite basic screen and the master screen. This moire intensity profile has the shape of the screen dot of the first screen; however, due to the angle difference of 45 degrees (in the present example), the second screen does not generate a visible moire intensity profile with the master screen, so that only the moire intensity profile due to the first screen is visible. However, when the master screen is rotated by about 45 degrees (in the present example), the first moire intensity profile becomes invisible, and it is the second screen of the composite basic screen which generates with the master screen a visible moire intensity profile, whose shape corresponds this time to the screen dot shape of the second screen. It should be understood that the description given here also holds for cases in which the master screen is a microlens array.

Thus, although the composite basic screen appearing on the document is scrambled and unintelligible, two different moire intensity profiles (in the example of FIG. 11C: the texts "EPFL/LSP" and "USA/$50") can become clearly visible when the appropriate master screen is superposed on the composite basic screen, each of the two moire intensity profiles being visible in a different orientation of the master screen.

Since the microstructure of the composite basic screen is unintelligible, and the individual screen dot shapes can only be made visible by superposing the appropriate master screen on top of the composite basic screen, it is therefore clear that if the master screen is not rendered public, the present technique becomes a covert anticounterfeit means, which can only be detected by the competent authorities or by automatic devices which possess the master screen.

This method is not limited to composite basic screens which are composed of two superposed dot-screens. On the contrary, further advantages can be obtained by using a composite basic screen which consists of more than two superposed dot-screens, possibly of different colors. For example, a composite basic screen may consist of three dot-screens with different dot shapes which are superposed with angle differences of 30 degrees (in which case no superposition moire is generated, as already known in the art of color printing). In this case, three different moire intensity profiles will be obtained by the master screen at angle differences of 30 degrees. However, some benefits can also be gained by using a composite basic screen in which some of the superposed dot-screens do generate a weak, visible moire effect; this weak visible moire effect may have a nice geometric form and serve as a decorative pattern on the document, while more dominant and completely different moire intensity profiles (for example: "EPFL/LSP" or "USA/$50") are revealed on top of this decorative pattern by using the master screen. (A weak moire effect can be generated, for example, by using for the basic screens in question lower gray levels, i.e. smaller screen dots.)

It should be noted that a composite basic screen printed on the document in accordance with the present invention need not necessarily be of a constant intensity level. On the contrary, it may include dots of gradually varying sizes and shapes, and it can be incorporated (or dissimulated) within any halftoned image printed on the document (such as a portrait, landscape, or any decorative motif, which may be different from the motif generated by the moire effects in the superposition). In the case of a composite basic screen, intensity level variations can be obtained, for instance, by varying the dot size and shape of each of the superposed screens independently (for example, using the dither matrix method, as illustrated in FIGS. 6, 7A and 7B for the simple case of a "1"-shaped screen dot).

It should be also noted that although the present disclosure has been illustrated, for the sake of simplicity, by examples with regular screens, this invention is by no means limited only to the case of regular screens, and similar results can be also obtained in the case of non-regular dot-screens (a dot-screen is called "non-regular" when its two main directions are not perpendicular and/or have different frequencies). However, in the case of technique 1, in a composite basic screen which is composed of non-regular dot-screens, each of the non-regular dot-screens which form the composite basic screen should have approximately the same internal angle between its two main directions and approximately the same frequencies in the respective directions (so that the same master screen will be appropriate for all the individual screens which together form the composite basic screen).

Technique 2: The composite basic screen method with multiple master screens

In this variant of the composite basic screen method, the composite basic screen may be composed of two (or more) superposed basic dot-screens, each having not only a different screen dot shape, but also different frequencies, and in the case of non-regular dot-screens, even different internal angles and/or different frequencies in the two main directions of each dot-screen. Therefore in this variant each dot-screen in the composite basic screen requires a different master screen for generating its moire intensity profile.

This multiple master screen variant offers a higher degree of security, since each of the moire intensity profiles hidden in the composite basic screen can only be revealed by its own, special master screen. Furthermore, this variant even enables the introduction of a hierarchy of security levels, each security level being protected by a different master screen (or a different combination of master screens). For example, one of the master screens can be intended for the general public, while the other master screens remain available only to the competent authorities or to automatic authentication devices. In this case, one of the moire intensity profiles can serve as a public authentication means of the document, while the other moire intensity profiles hidden in the same composite basic screen are not accessible to the general public.

It should be noted that as is the case in technique 1, the composite basic screen printed on the document may include dots of gradually varying sizes and shapes, and it can be incorporated (or dissimulated) within any halftoned image printed on the document, as already explained in the case of technique 1.

Note that any of the master screens in the multiple master screen variant can also be implemented by a microlens array with the appropriate angles and frequencies.

Technique 3: The Irregular sub-element alterations technique

This technique is an example of the perturbation patterns method, in which a basic screen (or a composite basic screen) on the document is rendered unintelligible by means of the introduction of perturbation patterns. Perturbation patterns can be introduced into the basic screen to render it unintelligible in several different ways. For the sake of example, in the present technique this is done by means of irregular sub-element alterations. This can be most clearly illustrated by means of the following example.

Figure 12C:
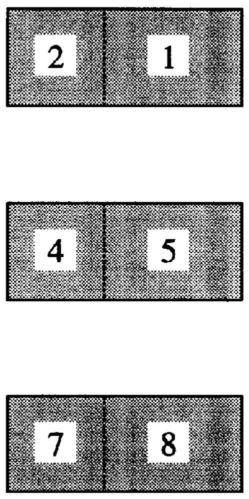
Figure 12D:
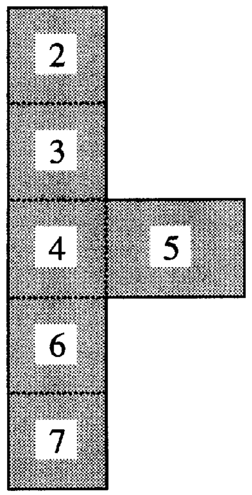
Figure 12E:
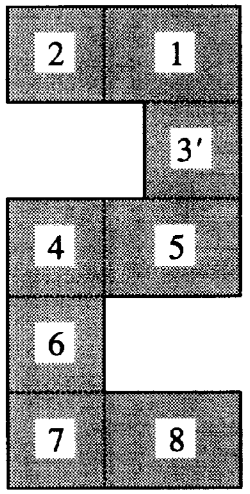
FIGS. 12E and 12F show how shifting of sub-elements can render the letter of FIG. 12A unintelligible.
Figure 12F:
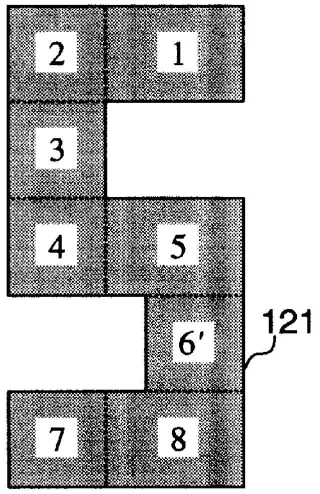

Assume we are given a dot-screen whose screen dot has the shape of "EPFL/LSP" as in FIG. 11A. Each part of the screen dot (in the present example, each individual letter) can be further divided into a certain number of sub-elements. For example, FIG. 12A shows a possible way to divide the letter "E" into sub-elements. This division into sub-elements should be done in such a way that missing sub-elements (such as 120 in FIG. 12B) render the letter unrecognizable, as shown for example in FIGS. 12B–12D. Moreover, additional segments or shifting of sub-elements (such as 121 in FIG. 12F) can also be used to render the letter unintelligible, as shown for example in FIGS. 12E and 12F.

Since the moire intensity profiles in the screen superposition are obtained by T-convolution, a small rate of perturbations (in the present example: sub-element alterations) in a screen element will hardly influence the resulting moire intensity profile, due to the averaging effect of the T-convolution. Therefore, if any of the "EPFL/LSP"-shaped screen dots of the dot-screen is slightly altered in order to make each individual letter unintelligible, but each occurrence of the screen dot "EPFL/LSP" is altered in a different way, such that on average each sub-element of each letter appears in most occurrences, and each of the extra sub-elements only appears in a small rate of occurrence, then the influence on the T-convolution will only be negligible. Therefore, the resulting moire intensity profile when the master screen is superposed remains almost as clear as in the unaltered case, although the basic screen itself is unintelligible even under a strong magnifying glass.

Figure 13:
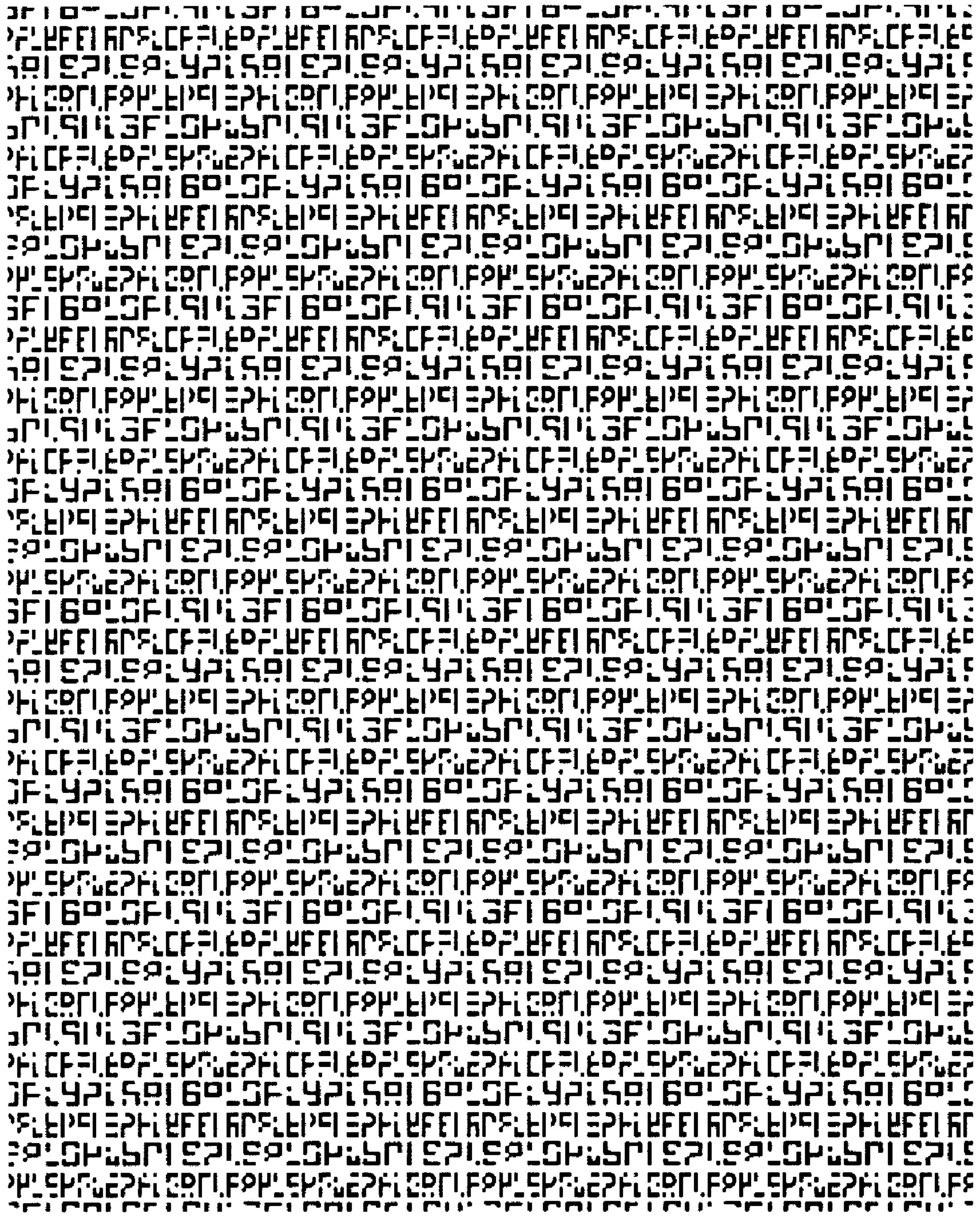
FIG. 13 shows a magnified example illustrating how the irregular sub-element alterations method can render the basic screen of FIG. 11 A unintelligible.

In practice, an irregular alteration of sub-elements can be obtained by dividing the basic screen into large super-tiles, each super-tile consisting of m×n screen dots ("EPFL/LSP", in the present example) where m,n are integer numbers, preferably larger than 10. Each occurrence of the screen dot within the super-tile is slightly altered in the way explained above, each occurrence in a different way, but the large super-tile itself is repeated periodically throughout the basic screen. FIG. 13 shows a magnified example of such a basic screen which is based on the "EPFL/LSP"-shaped screen dot of FIG. 11A. Note that the same super-tile can also be used for performing intensity level variations and halftoning with the basic screen (using the dither matrix method, as illustrated in FIGS. 6, 7A and 7B for the simple case of a "1"-shaped screen dot).

The irregular sub-element alterations technique can be practically implemented in 5 steps as described below:

1. A computer program divides each part of the screen element (in the case of the example above: each of the letters E,P,F,L,L,S,P) into a predefined number of sub-elements.
2. Then, the computer program generates for each of the screen element parts (letters, in the present example) a series of variants, by omitting, shifting, exchanging or adding sub-elements, as illustrated in FIGS. 12B–12F.
3. The designer or the graphist then selects a certain number N of variants (for example, N=10) for each of the different screen element parts (letters, in the present example), choosing from the variants generated in step 2 those in which the original form is the least recognizable.
4. Then, the designer or a computer program generates the large super-tile (which consists of m×n screen elements) by choosing for each occurrence of any screen element part within each of the m×n screen elements a different variant (from the set of N variants selected for this screen element part in step 3): This is done in a statistically uniform way, where each sub-element is missing in only up to 10%–20% of the occurrences of the screen element part in the super-tile, and each additional sub-element appears in no more than 10%–20% of the occurrences of the screen element part in the super-tile.
5. This super-tile is then used, as already known in the art, for generating the masked basic screen for the case of the irregular sub-element alterations technique.

The irregular sub-element alterations technique can also be used for performing intensity level variations and halftoning with the masked basic screen. This can be done using the dither matrix method, as illustrated in FIGS. 6, 7A and 7B for the simple case of a "1"-shaped screen dot, but this time using an altered super-dither matrix whose size equals that of the super-tile. This altered super-dither matrix can be obtained, for example, by first preparing an elementary dither matrix which corresponds to the original, unaltered screen element. Then, variants of this elementary dither matrix are obtained by performing the sub-element alterations (the omitting, shifting, exchanging or adding of sub-elements) inside copies of the original elementary dither matrix, and these variants are then incorporated into the altered super-dither matrix, in accordance with steps 1–5 above. After incorporating the sub-element alterations within the super-dither matrix, dither threshold levels in the super-dither matrix can be renumbered so as to generate a continuous sequence of threshold levels.

In the case of a multicolor basic screen, a similar effect can also be obtained by irregular alterations in the color of the sub-elements. Furthermore, as shown in FIGS. 16A and 16B, in the multichromatic case the screen dots of the basic screen can be divided into sub-elements of different colors, while the background (the area between the screen dots) can be divided into sub-elements of other colors (for example, brighter colors). By way of example, the colors of the sub-elements of the screen dots can be arbitrarily chosen from one set of colors (161) and the colors of the background sub-elements can be arbitrarily chosen from a second set of colors (162) (for example, brighter colors). The multichromatic basic screen thus obtained can be generated as already explained in the section "The multichromatic case" above. This method turns the basic screen into a multichromatic mosaic of sub-elements, making it even more unintelligible; and moreover, it renders counterfeiting the document even more difficult due to the high registration accuracy required, as already explained in the section "The multichromatic case" above. Since registration errors are almost unavoidable in a falsified document having such a multichromatic basic screen, the moire profiles obtained will be fuzzy and corrupted in their shape as well as in their color, thereby making the falsification obvious.

It should be noted that the perturbation patterns method, and in particular the irregular sub-element alterations technique, can be used as a covert anticounterfeit and authentication means even with a single basic screen. However, this method can also be used in any combination with the masking layer method and/or the composite basic screen method, thereby further enhancing the security offered by the individual methods.

Computer-based authentication of documents by matching prestored and acquired moire intensity profiles Since for a basic screen of frequency $f_1$ and $f_2$ and for a master screen of frequency $f_3$ and $f_4$ the resulting ($k_1$,$k_2$,$k_3$, $k_4$)-moire has the frequencies:

$$a=(a_u,a_v)$$

$$b=(b_u,b_v)$$

which are given by Eq. (13), the orientations $\phi_1$, $\phi_2$ and the periods $T_1$, $T_2$ of the moire's main axes are, according to Eq. (6):

$$\varphi_1 = \arctan(a_v / a_u)$$

$$\varphi_2 = \arctan(b_v / b_u)$$

$$T_1 = 1 \Big/ \sqrt{a_u^2 + a_v^2}$$

$$T_2 = 1 \Big/ \sqrt{b_u^2 + b_v^2}$$

As explained earlier in the present disclosure, the prestored moire intensity profile can be obtained either by acquisition or by precalculation. However, in order to take into account the influence of the image acquisition device, for example a CCD camera, it is advantageous to obtain the prestored moire intensity profile by the acquisition of the moire intensity profile produced by the superposition of the master screen and an original document incorporating the basic screen. Since the acquisition of the prestored moire intensity profile only occurs once, a careful adjustment of the superposition ensures that the orientations of the main axes of the acquired prestored moire intensity profile correspond exactly to the precalculated orientations $\phi_1$,$\phi_2$. Hence, the periods $P_1$,$P_2$ of the acquired presored moire intensity profile (in terms of the acquisition device units, for example, pixels), correspond to the precalculated periods $T_1$,$T_2$ (in terms of document space units). The periods $P_1$,$P_2$ in terms of the acquisition device units can be found by intersecting the prestored moire intensity profile with a straight line parallel to one of the two main axes, say the first axis, of the prestored moire intensity profile. A discrete straight line segment representing the intensity profile along this straight line is obtained by resampling the straight line at the acquired moire intensity profile resolution. The period $P_1$ of the resulting discrete straight line segment is measured, and period $P_2$ of the prestored moire intensity profile along the other main axis may be obtained for example by calculating $P_2=P_1(T_2/T_1)$.

Consider, as an exemple, FIG. 15A, showing a prestored moire intensity profile which is schematically represented in the drawing by triangular elements 150. In this example, the main axes of the prestored moire intensity profile are axis 151 at orientation $\phi_1$ and axis 152 at orientation $\phi_2$. Along the first main axis 151 the period of the prestored moire intensity is $P_1$, and along the second main axis 152 the period of the prestored moire intensity is $P_2$.

Note that hereinafter the prestored moire intensity profile will also be called "prestored moire image", since the prestored moire intensity profile is stored in the same way as a digital grayscale or color image. For the same reason, an acquired moire intensity profile will also hereinafter be called "acquired moire image".

The acquired moire intensity profiles obtained by acquiring the superposition of the master screen and a non-counterfeited document will always have the same geometry as the prestored moire intensity profile, up to a rotation angle error, a scaling error a, and a translation error ($\tau_x$,$\tau_y$) which is also called "phase differences". These errors in the acquired moire image may occur due to the limited accuracy of the feeding mechanism positioning the basic screen beneath the master screen and the image acquisition means (e.g. the CCD camera). FIG. 15B shows an example of an acquired moire intensity profile originating from the superposition of the master screen and of a non-counterfeited document. When the errors $\delta$, $\sigma$ and ($\tau_x$,$\tau_y$) are corrected, as explained below, the geometrically corrected acquired moire image will perfectly match the prestored moire image. However, in the case of a counterfeited document, even after these geometric corrections have been carried out the acquired moire intensity profile will not match the prestored moire intensity profile (due to differences in intensity profile, in moire shape or even due to the lack of periodicity in the acquired moire image).

In order to find out and correct the rotation angle error $\delta$ and the scaling error $\sigma$, different methods can be used. As an example, which is provided in an illustrative and non-limiting manner, the method described below relies on the intersection of lines with the aquired moire intensity profile. The goal is to obtain a line (such as line 159 in FIG. 15B) which intersects the acquired moire intensity profile along its main direction. For this purpose, a line is first drawn along the main direction of the prestored moire intensity profile (such as line 155 in FIG. 15B). Since this line possibly does not intersect any moire shapes (represented in the drawing by triangular elements), further parallel lines are generated, such as line 157, until moire shapes are intersected. Then the resulting line is rotated, until it shows a periodic intensity signal (for example line 159 shows the periodic intensity signal 1510 in FIG. 15C). The angle $\delta$ between that line (159) and the main axis of the prestored moire intensity profile gives the rotation angle error. The ratio between the period of that intensity signal (1510) and period $P_1$ of the prestored moire intensity profile gives the scaling error a.

The following paragraph describes the method of this example in more details. It describes how rotation angle error $\delta$ and scaling error care recovered, and also mentions conditions for rejecting or accepting a document. In the following explanation it is assumed that the scaling error $\sigma$ is larger than a certain fraction $\sigma_{min}$(say, 0.5) and smaller than a certain number $\sigma_{max}$(say, 2). The term "quasi-period" will mean in the following explanation a distance between two consecutive low-to-high (or high-to-low) intensity transitions of a possibly non-periodic one-dimensional signal.

The rotation angle error 6 and the scaling error $\sigma$ between the prestored moire intensity profile and an acquired moire intensity profile can be determined, for example, by intersecting the acquired moire intensity profile with a straight line parallel to one of the two main axes, say the first axis, of the prestored moire intensity profile. A discrete straight line segment representing the intensity profile along this straight line is obtained by resampling the straight line at the acquired moire intensity profile resolution. The resulting discrete straight line segment (for example segment 155 in FIG. 15B, shown in the drawing as a continuous line) is subsequently analyzed and checked for a valid intensity variation along the line; a valid intensity variation is defined as an intensity variation with a quasi-period not smaller than $\sigma_{min}$(for example, 0.5) times the smallest of the two periods $P_1$, $P_2$ of the prestored moire intensity profile and not larger than $\sigma_{max}$(for example, 2) times the largest of the two periods $P_1$, $P_2$ of the prestored moire intensity profile. If such a valid intensity variation is not found, or if it is below a given intensity threshold, for example below half the maximal intensity difference, another discrete straight line segment is generated parallel to the previous discrete straight line segment (this new discrete straight line segment is called "a parallel instance" of the previous discrete straight line segment). This parallel discrete straight line segment is generated at a distance $\gamma$(156 in FIG. 15B) apart from the previous discrete straight line segment (the distance $\gamma$ being, for example, ¼ of period $P_2$). Line segment 157 in FIG. 15B is an example of such a parallel discrete straight line segment. If again no valid intensity variation is detected, further parallel discrete straight line segments are generated as before at a distance $\gamma$ apart from each other and checked for valid intensity variations. If no valid intensity variation is detected after having generated discrete straight line segments across, for example, twice the full period $P_2$, the document is rejected. In the case where a valid intensity variation is detected, it is checked if successive quasi-periods of the intensity variation along the discrete straight line segment are identical, i.e. if the one-dimensional intensity signal represented by the discrete straight line segment is periodic. In FIG. 15C, 1511 illustrates a non-periodic intensity signal with two non-identical successive quasi-periods, and 1510 illustrates a periodic intensity signal with two identical quasi-periods. If no periodicity is detected in the considered discrete straight line segment, a new rotated discrete straight line segment is generated whose orientation differs from the previous discrete straight line segment by a fraction (for example 1/20) of $\delta_{max}$, where $\delta_{max}$ is the maximal possible rotation angle error, for example ±10 degrees. An example of such a discrete straight line segment is shown by 159 in FIG. 15B. Further such rotated discrete straight line segments are generated, always rotated by a fraction of the maximal possible rotation angle, until one of them contains a periodic intensity signal with a period P not smaller than $\sigma_{min}$ (for example, 0.5) times the period $P_1$ and not larger than $\sigma_{max}$ (for example, 2) times the period $P_1$. (It should be understood that periodicity in a discrete signal is admitted up to a certain small precision error in pixels). If none of the successive rotated discrete straight line segments covering the angle range of $\pm\delta_{max}$ contains a periodic intensity signal with a period P not smaller than $\sigma_{min}$(for example, 0.5) times the period of the prestored moire and not larger than $\sigma_{max}$(for example, 2) times that period, the document with the basic screen is rejected.

If such a periodic discrete straight line segment with a period P has been found, the scaling error $\sigma$ and the angle error $\delta$ of the acquired moire intensity profile are determined as follows:

The scaling error $\sigma$ is obtained by $\sigma=P/P_1$, where P is the period of the so-obtained periodic intensity signal and $P_1$ is the corresponding period of the prestored moire intensity profile. The angle error $\delta$ is the angle difference between this resulting periodic discrete straight line segment and the main axis of the prestored moire intensity profile (see angle $\delta$ in FIG. 15B).

Having found the angle error $\delta$ and the scaling error $\sigma$ of the acquired moire intensity profile, a window of the acquired moire intensity profile containing at least one fill moire element given by its periods ($\sigma P_1$, $\sigma P_2$) in its two main directions is extracted, rotated and scaled by a linear transformation, where the rotation angle is $-\delta$ and the scaling factor is $1/\sigma$, so as to obtain exactly the same periods and orientations as the periods ($P_1$,$P_2$) and orientations ($\phi_1$, $\phi_2$) of the prestored moire intensity profile. Regarding image extraction, affine transformation, scaling and rotation, see for example the book "Digital Image Processing", by W. K. Pratt, Chapter 14: "Geometrical image modification").

The geometrically corrected moire intensity profile thus obtained is then matched with the prestored moire intensity profile so as to produce a degree of proximity between the two. Matching a given image with a prestored image can be done, for example, by template matching, as described in the book "Digital Image Processing and Computer Vision", by R. J. Schalkoff, pp 279–286. For template matching, one may use the correlation techniques which give an intensity proximity value $C(s_x,s_y)$ between the two images as a function of their relative shift $(s_x,s_y)$. The largest intensity proximity value gives the translation error $(\tau_x,\tau_y)=(s_x,s_y)$. If the so-computed largest intensity proximity value is higher than an experimentally determined intensity proximity threshold value the document is accepted, and otherwise the document is rejected.

Accordingly, the method described in detail in the example above, where comparing a moire intensity profile with a prestored moire intensity profile is done by computer-based matching, which requires an acquisition of a moire intensity profile and a geometrical correction of a rotation angle error and of a scaling error in the acquired moire intensity profile, comprises the steps of:

a) acquiring a moire intensity profile by an image acquisition means;

b) intersecting the acquired moire intensity profile with a straigtht line parallel to a main axis of the prestored moire intensity profile;

c) computing a discrete straight line segment representing the acquired moire intensity profile along the straight line by resampling the straight line intersecting the acquired moire intensity profile at the resolution of the acquired moire intensity profile;

d) checking the considered discrete straight line segment as well as parallel instances of it for valid intensity variations defined as intensity variations with a quasi-period not smaller than $\sigma_{min}$ times the smallest of the two periods $P_1$, $P_2$ of the prestored moire intensity profile and not larger than $\tau_{max}$ times the largest of the two periods $P_1$, $P_2$ of the prestored moire intensity profile;

e) rejecting the document in the case where no valid intensity variations occur in any of the parallel discrete straight line segment instances;

f) in the case of valid intensity variations, rotating the discrete straight line segment showing valid intensity variations until an angle $\delta$ is reached in which the rotated discrete straight line segment comprises successive identical quasi-periods P of intensity variations;

g) computing the scaling error $\sigma=P/P_1$;

h) using angle $\delta$ and scaling error $\sigma$ to rotate by angle $-\delta$ and to scale by factor $1/\sigma$ a window of the acquired moire intensity profile containing at least one period of said acquired moire intensity profile, thereby obtaining a geometrically corrected moire intensity profile;

i) matching the so-obtained geometrically corrected moire intensity profile with the prestored moire intensity profile and obtaining a proximity value giving the proximity between the acquired moire intensity profile and the prestored moire intensity profile; and j) rejecting the document if the proximity value is lower than an experimentally determined threshold.

In the case of a color basic screen, a prestored color moire image can be obtained in the same way as in the case of a black-and-white basic screen and compared with a color moire image acquired by a color image acquisition device. The computation of rotation angle error $\delta$ and scaling error a can be done as in the case of a black-and-white basic screen, by computing from the Red Green Blue (RGB) pixel values of the acquired color moire image the corresponding Y I Q values, where Y represents the achromatic intensity values and I and Q represent the chromaticity values of the color moire image (for a detailed description of the R G B to Y I Q coordinate transformation, see for example the book "Computer Graphics: Principles and Practice", by J. D. Foley, A. Van Dam, S. K. Feiner and J. F. Hughes, Section 13.3.3, p. 589).

Matching a prestored color moire image with an acquired color moire image (after it has been geometrically corrected) can be done in a similar manner as in the black-and-white case, using the Y coordinate as the achromatic moire intensity profile. As in the black-and-white case, the largest intensity proximity value and the translation error (m,x) (i.e. the phase differences in the two main directions between the prestored and the acquired moire images) can be found, for example, by template matching. Here, too, if the largest intensity proximity value is lower than an experimentally determined intensity proximity threshold value, the document is rejected. But if the intensity proximity value is higher than the experimentally determined proximity threshold value, the document undergoes an additional test using the chromaticity acceptance criterion, which is based on a chromatic Euclidian distance.

Using the same phase differences $(\tau_x,\tau_y)$, a chromatic Euclidian distance in the IQ colorimetric plane is computed for each pixel between the geometrically corrected acquired moire image and the prestored moire image. The average chromatic Euclidian distance is a measure of a chromatic proximity between the acquired moire image and the prestored moire image: a small average chromatic Euclidian distance indicates a high degree of proximity, and vice versa. Using this criterion, a document is accepted if the average chromatic Euclidian distance is lower than an experimentally determined chromatic Euclidian distance threshold, and rejected if the average chromatic Euclidian distance is higher than an experimentally determined chromatic Euclidian distance threshold.

The maximal possible rotation angle error $\delta_{max}$ can be experimentally determined by acquiring the moire image obtained when a document is fed by the document handling device with the greatest possible rotational feeding error, and by comparing the orientation of the so-acquired moire image with the orientation of the prestored moire image. Furthermore, various instances of the original document as well as reproductions of it (simulating counterfeited documents) may be acquired according to the method described above. The different intensity proximity values obtained for the original documents on the one hand, and for the reproductions on the other hand, enable the setting of the experimentally determined intensity proximity threshold value, so that the intensity proximity values of the original documents are above the threshold and the intensity proximity values of the reproduced documents are below the threshold. The same technique is also applied for setting the experimentally determined chromatic Euclidian distance threshold, so that for original documents the average chromatic Euclidian distances are below the chromatic Euclidian distance threshold and for reproduced documents the chromatic Euclidian distances are above this threshold.

As mentioned above in the section "The multichromatic case", when a color document is printed at high resolution, color registration problems occur. Counterfeiters trying to falsify the color document by printing it using a standard printing process will also have, in addition to the problems of creating the basic screen, problems of color registration. Without correct color registration, the basic screen will incorporate distorted screen dots. Therefore, the intensity profile of the moire acquired with the master screen applied to a counterfeited document will clearly distinguish itself, in terms of form and intensity as well as in terms of color, from the moire profile obtained when applying the master screen to the non-counterfeited document. The measures of proximity with respect to both intensity and chromaticity, as described above, will clearly distinguish between a falsified document and a genuine one and allow the rejection of counterfeited documents by the apparatus described below. Since counterfeiters will always have color printers with less accuracy than the official bodies responsible for printing the original valuable documents (banknotes, checks, etc.), the disclosed authentication method remains valid even with the quality improvement of color reproduction technologies.

Apparatus for the authentication of documents using the intensity profile of moire patterns An apparatus for the visual authentication of documents comprising a basic screen may comprise a master screen (either a dot-screen or a microlens array) prepared in accordance with the present disclosure, which is to be placed on the basic screen of the document, while the document itself is placed on the top of a box containing a diffuse light source (or possibly under a source of diffuse light, in case the master screen is a microlens array and the moire intensity profile is observed by reflection). If the authentication is made by visualization, i.e. by a human operator, human biosystems (a human eye and brain) are used as a means for the acquisition of the moire intensity profile produced by the superposition of the basic screen and the master screen, and as a means for comparing the acquired moire intensity profile with a prestored moire intensity profile.

Figure 10:
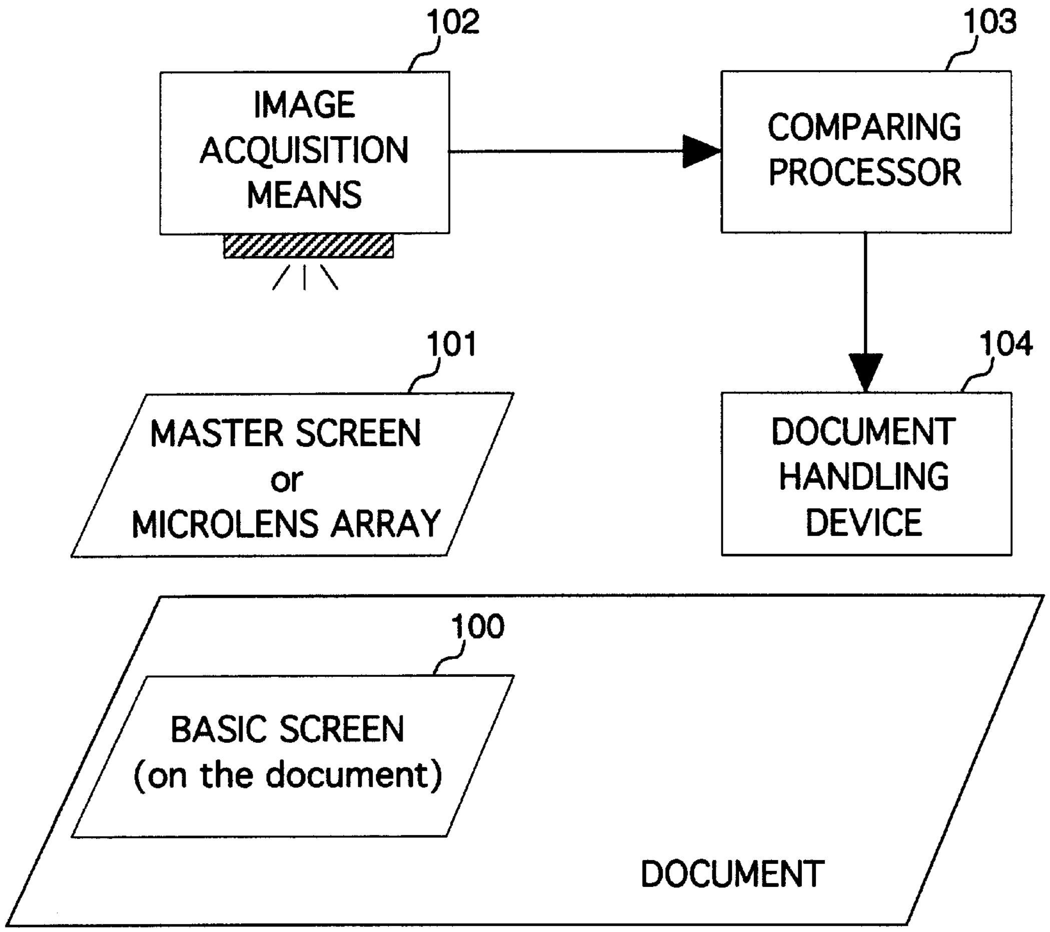
FIG. 10 is a block diagram of an apparatus for the authentication of documents by using the intensity profile of moire patterns.

An apparatus for the automatic authentication of documents, whose block diagram is shown in FIG. 10, comprises a master screen 101 (either a dot-screen or a microlens array), an image acquisition means (102) such as a CCD camera, a source of light (not shown in the drawing), and a comparing processor (103) for comparing the acquired moire intensity profile with a prestored moire intensity profile. In case the match fails, the document will not be authenticated and the document handling device of the apparatus (104) will reject the document. The comparing processor 103 can be realized by a microcomputer comprising a processor, memory and input-output ports. An integrated one-chip microcomputer can be used for that purpose. For automatic authentication, the image acquisition means 102 needs to be connected to the microprocessor (the comparing processor 103), which in turn controls a document handling device 104 for accepting or rejecting a document to be authenticated, according to the comparison operated by the microprocessor.

The prestored moire intensity profile can be obtained either by image acquisition, for example by means of a CCD camera, of the superposition of a sample basic screen and the master screen, or it can be obtained by precalculation. The precalculation can be done either in the image domain or in the spectral domain, as explained earlier in the present disclosure.

The comparing processor makes the image comparison by matching a given image with a prestored image; examples of ways of carrying out this comparison have been presented in detail in the previous section. This comparison produces at least one proximity value giving the degree of proximity between the acquired moire intensity profile and the prestored moire intensity profile. These proximity values are then used as criteria for making the document handling device accept or reject the document.

Advantages of the present invention

The present invention completely differs from methods previously known in the art which use moire effects for the authentication of documents. In such existing methods, the original document is provided with special patterns or elements which when counterfeited by means of halftone reproduction show a moire pattern of high contrast. Similar methods are also used for the prevention of digital photocopying or digital scanning of documents. In all these previously known methods, the presence of moire patterns indicates that the document in question is counterfeit. However, the present invention is unique inasmuch as it takes advantage of the intentional generation of a moire pattern having a particular intensity profile, whose existence and whose shape are used as a means of authentication of the document, and all this without having any latent image predesigned on the document. The approach on which the present invention is based further differs from that of prior art in that it not only provides fill mastering of the qualitative geometric properties of the generated moire (such as its period and its orientation), but it also permits to determine quantitatively the intensity levels of the generated moire.

The fact that moire effects generated between superposed dot-screens are very sensitive to any microscopic variations in the screened layers makes any document protected according to the present invention practically impossible to counterfeit, and serves as a means to easily distinguish between a real document and a falsified one.

Furthermore, unlike previously known moire-based anti-counterfeiting methods, which are only effective against counterfeiting by digital equipment (digital scanners or photocopiers), the present invention is equally effective in the cases of analog or digital equipment.

A further important advantage of the present invention is that it can be used for authenticating documents printed on any kind of support, including paper, plastic materials, etc., which may be transparent or opaque. Furthermore, the present invented method can be incorporated into the standard document printing process, so that it offers high security at the same cost as standard state of the art document production.

Yet a further advantage of the present invention is that it can be used, depending on the needs, either as an overt means of document protection which is intended for the general public; or as a covert means of protection which is only detectable by the competent authorities or by automatic authentication devices; or even as a combination of the two, thereby permitting various levels of protection. The covert methods disclosed in the present invention also have the additional advantage of being extremely difficult to re-engineer, thus further enhancing document security.

We claim:

1. A method for authenticating documents by using at least one Moire intensity profile, the method comprising the steps of:

a) creating on a document a basic screen with at least one basic screen dot shape;

b) creating a master screen with a master screen dot shape;

c) superposing the master screen and the basic screen, thereby producing a Moire intensity profile; and d) comparing said Moire intensity profile with a prestored Moire intensity profile and depending on the result of the comparison, accepting or rejecting the document;

where the produced Moire intensity profile is a normalized T-convolution of the basic screen and of the master screen and where the orientation and period of the produced Moire intensity profile are determined by the orientations and periods of the basic screen and of the master screen.

2. The method of claim 1, where the master screen contains tiny dots and where the Moire intensity profile is a magnified and rotated version of the basic screen dot shape.

3. The method of claim 1, where the prestored Moire intensity profile is obtained by an operation selected from the set of operations comprising:

a) image acquisition of the superposition of the basic screen and the master screen;

b) precalculation in the image domain, by finding the normalized T-convolution of the basic screen and the master screen; and c) precalculation in the spectral domain, by extracting from the convolution of the frequency spectrum of the basic screen and the frequency spectrum of the master screen those impulses describing a $(k_1,k_2,k_3,k_4)$-Moire, and applying to said impulses an inverse Fourier transform.

4. The method of claim 1, where the basic screen and the master screen are printed on a transparent support, and where comparing the Moire intensity profile with a prestored Moire intensity profile is done by visualization.

5. The method of claim 4, where the basic screen and the master screen are printed on two different areas of the same document, thereby enabling the visualization of the Moire intensity profile to be performed by superposition of the basic screen and the master screen of said document.

6. The method of claim 1, where the master screen is a microlens array, thereby letting the incident light pass through the transparent substrate between neighboring microlenses and thereby allowing a Moire intensity profile to be produced by reflection.

7. The method of claim 6, where the document comprising the basic screen is printed on an opaque support, thereby allowing the document to be printed by a standard document printing process.

8. The method of claim 1, where the basic screen is a multichromatic basic screen whose individual elements are colored, thereby generating a color Moire image when the master screen is superposed on said basic screen.

9. The method of claim 1, where the basic screen is a masked basic screen, thereby offering a covert means of authentication and making the re-engineering of the basic document extremely difficult.

10. The method of claim 9, where the masked basic screen is a composite basic screen composed of at least two differently oriented dot-screens superposed on top of one another, thereby generating a complex unintelligible microstructure, where each of said dot-screens can generate a visible Moire intensity profile by the superposition of the master screen and said basic screen, and where the orientation of the master screen determines which of the dot-screens generates the visible Moire intensity profile with the superposed master screen.

11. The method of claim 10, where the composite basic screen comprises at least two dot-screens of different colors and where the Moire intensity profile obtained by the superposition of the master screen and the composite basic screen approximates both the color and the intensity profile of each of said dot-screens.

12. The method of claim 10, where each of the superposed dot-screens of the composite basic screen has a different frequency, thereby requiring a different master screen for generating a Moire intensity profile with each of said dot-screens.

13. The method of claim 9, where the masked basic screen is obtained by introduction of perturbation patterns into the basic screen.

14. The method of claim 13, where said perturbation patterns are obtained by means of operations selected from the group comprising: mathematical operations, statistical operations and logical Boolean operations.

15. The method of claim 13, where perturbation patterns are obtained by irregular alterations of sub-elements of the screen elements, the generation of the irregular alterations comprising the steps of:

a) dividing each screen element part into sub-elements;

b) generating for each of the screen element parts a series of variants by applying to each of the screen element parts operations selected from the set of operations comprising: omitting sub-elements, shifting sub-elements, exchanging sub-elements, and adding sub-elements;

c) selecting for each of the screen element parts a set of variants from the series of variants generated for it in step b);

d) generating a super-tile comprising an integer number of screen elements by choosing for each occurrence of any screen element part within each of the screen elements of the super-tile a different variant, ensuring that missing sub-elements are missing only in up to 10% to 20% of the occurrences of the screen element part in the super-tile and that additional sub-elements appear in no more than 10% to 20% of the occurrences of the screen element part in the super-tile; and e) using the super-tile for generating the masked basic screen.

16. The method of claim 15, where the basic screen is a multichromatic basic screen and where the set of operations applied to each of the screen element parts also comprises alterations of the color of the sub-elements, thereby turning the basic screen into a multichromatic mosaic of sub-elements which is difficult to counterfeit due to the required high registration accuracy.

17. The method of claim 9, where the masked basic screen is obtained by introduction of perturbation patterns into the dither matrix used for generating the basic screen.

18. The method of claim 17, where said perturbation patterns are obtained by means of operations selected from the group comprising: mathematical operations, statistical operations and logical Boolean operations.

19. The method of claim 1, where comparing a Moire intensity profile with a prestored Moire intensity profile is done by computer-based matching, which requires an acquisition of a Moire intensity profile and a geometrical correction of a rotation angle error and of a scaling error in the acquired Moire intensity profile, comprising the steps of:

a) acquiring a Moire intensity profile by an image acquisition means;

b) intersecting the acquired Moire intensity profile with a straight line parallel to a main axis of the prestored Moire intensity profile;

c) computing a discrete straight line segment representing the acquired Moire intensity profile along the straight line by resampling the straight line intersecting the acquired Moire intensity profile at the resolution of the acquired Moire intensity profile;

d) checking the considered discrete straight line segment as well as parallel instances of it for valid intensity variations defined as intensity variations with a quasi-period not smaller than $\sigma_{min}$ times the smallest of the two periods $P_1$, $P_2$ of the prestored Moire intensity profile and not larger than $\sigma_{max}$ times the largest of the two periods $P_1$, $P_2$ of the prestored Moire intensity profile;

e) rejecting the document in the case where no valid intensity variations occur in any of the parallel discrete straight line segment instances;

f) in the case of valid intensity variations, rotating the discrete straight line segment showing valid intensity variations until an angle d is reached in which the rotated discrete straight line segment comprises successive identical quasi-periods P of intensity variations;

g) computing the scaling error $\sigma=P/P_1$;

h) using angle $\delta$ and scaling error $\sigma$ to rotate by angle $-\delta$ and to scale by factor $1/\sigma$ a window of the acquired Moire intensity profile containing at least one period of said acquired Moire intensity profile, thereby obtaining a geometrically corrected Moire intensity profile;

i) matching the so-obtained geometrically corrected Moire intensity profile with the prestored Moire intensity profile and obtaining a proximity value giving the proximity between the acquired Moire intensity profile and the prestored Moire intensity profile; and j) rejecting the document if the proximity value is lower than an experimentally determined threshold.

20. The method of claim 19, where the basic screen is a color screen, and where the acquired Moire intensity profile and the prestored Moire intensity profile are, respectively, an acquired color Moire image and a prestored color Moire image, whose Y coordinate in the YIQ space is used as the achromatic Moire intensity profile, and where in addition to the matching of the Y coordinates of the geometrically corrected acquired color Moire image with the Y coordinates of the prestored color Moire image, an average chromatic Euclidian distance in the chromatic IQ plane is computed between the geometrically corrected acquired color Moire image and the prestored color Moire image, and where the document is rejected if this chromatic Euclidian distance is higher than an experimentally determined chromatic Euclidian distance threshold.

21. An apparatus for authentication of documents making use of at least one Moire intensity profile, the apparatus comprising:

a) a master screen;

b) an image acquisition means operable for acquiring a Moire intensity profile produced by the superposition of a basic screen printed on a document and the master screen;

c) a source of light; and d) a comparing means operable for comparing the acquired Moire intensity profile with a prestored Moire intensity profile; where the produced Moire intensity profile is a normalized T-convolution of the basic screen and of the master screen and where the orientation and period of the produced Moire intensity profile are determined by the orientations and periods of the basic screen and of the master screen.

22. The apparatus of claim 21, where the master screen is a microlens array.

23. The apparatus of claim 21, where the image acquisition means and the comparing means are human biosystems, a human eye and brain respectively.

24. The apparatus of claim 21, where the comparing means is a comparing processor controlling a document handling device accepting, respectively rejecting a document to be authenticated, according to the comparison operated by the comparing processor.

25. The apparatus of claim 24, where the comparing processor is a microcomputer comprising a processor, memory and input-output ports and where the image acquisition means is a CCD camera connected to said microcomputer.

26. A method for Authenticating documents by using at least one Moire intensity profile, the method comprising the steps of:

i) creating on a document a basic screen with at least one basic screen dot shape;

ii) creating a master screen with a master screen dot shape;

iii) superposing the master screen and the basic screen, thereby producing a Moire intensity profile; and iv) comparing said Moire intensity profile with a prestored Moire intensity profile and depending on the result of the comparison, accepting or rejecting the document; where comparing a Moire intensity profile with a prestored Moire intensity profile is done by computer-based matching, which requires an acquisition of a Moire intensity profile and a geometrical correction of a rotation angle error and of a scaling error in the acquired Moire intensity profile, comprising the steps of:

a) acquiring a Moire intensity profile by an image acquisition means;

b) intersecting the acquired Moire intensity profile with a straight line parallel to a main axis of the prestored Moire intensity profile;

c) computing a discrete straight line segment representing the acquired Moire intensity profile along the straight line by resampling the straight line intersecting the acquired Moire intensity profile at the resolution of the acquired Moire intensity profile;

d) checking the considered discrete straight line segment as well as parallel instances of it for valid intensity variations defined as intensity variations with a quasi-period not smaller than $\sigma_{min}$ times the smallest of the two periods $P_1$, $P_2$ of the prestored Moire intensity profile and not larger than $\sigma_{max}$ times the largest of the two periods $P_1$, $P_2$ of the prestored Moire intensity profile;

e) rejecting the document in the case where no valid intensity variations occur in any of the parallel discrete straight line segment instances;

f) in the case of valid intensity variations, rotating the discrete straight line segment showing valid intensity variations until an angle $\delta$ is reached in which the rotated discrete straight line segment comprises successive identical quasi-periods P of intensity variations;

g) computing the scaling error $\sigma=P/P_1$;

h) using the angle $\delta$ and the scaling error $\sigma$ to rotate by angle $\delta$ and to scale by factor $1/\sigma$ a window of the acquired Moire intensity profile containing at least one period of said acquired Moire intensity profile, thereby obtaining a geometrically corrected Moire intensity profile;

i) matching the so-obtained geometrically corrected Moire intensity profile with the prestored Moire intensity profile and obtaining a proximity value giving the proximity between the acquired Moire intensity profile and the prestored Moire intensity profile; and j) rejecting the document if the proximity value is lower than an experimentally determined threshold.

27. The method of claim 26, where the basic screen is a color screen, and where the acquired Moire intensity profile and the prestored Moire intensity profile are, respectively, an acquired color Moire image and a prestored color Moire image, whose Y coordinate in the YIQ space is used as the achromatic Moire intensity profile, and where in addition to the matching of the Y coordinates of the geometrically corrected acquired color Moire image with the Y coordinates of the prestored color Moire image, an average chromatic Euclidian distance in the chromatic IQ plane is computed between the geometrically corrected acquired Moire image and the prestored color Moire image, and where the document is rejected if this chromatic Euclidian distance is higher than an experimentally determined chromatic Euclidian distance threshold.

* * * * *

CERTIFICATE OF CORRECTION

PATENT NO. : 5,995,638
DATED : Nov. 30, 1999

INVENTOR(S) : Isaac AMIDROR, Roger D. HERSCH

It is certified that error appears in the above-identified patent and that said Letters Patent is hereby corrected as shown below:

On the title page item [57], change "New method" to —New methods—.

Col. 3, line 35, change "Furthersore" to —Furthermore—.

Col. 3, line 64, change "pre sent" to —present—.

Col. 4, line 4, change "Amidro94" to —Amidror94—.

Col. 5, line 34, change "straight lines; and" to —straight lines;—.

Col. 6, line 7, change "$p(u,v) = r_1(u,v)r_2(u,v)...r_m(u,v)$" to

—$R(u,v) = R_1(u,v)R_2(u,v)...**R_m(u,v)$—.

Col. 8, line 37, center the section title "Moires between superposed line-gratings".

Col. 9, line 3, change "$c_n=a^{(1)}_{nk_1}\, a^{(2)}_{nk_2}$" to —$c_n = a^{(1)}_{nk_1}\, a^{(2)}_{nk_2}$—.

Col. 9, line 61, change "angle difference a" to —angle difference $\alpha$—.

Col. 10, line 27, center the section title "Moires between superposed dot-screens".

Col. 10 line 36, change "$\theta_2$+90°" to —"$\theta_1$+90°"—.

Col. 13, line 61, change "T-convolution off" to —T-convolution of f—.

Col. 14, line 8, change "$L_3(u,v)$" to —"$L_M(u,v)$"—.

UNITED STATES PATENT AND TRADEMARK OFFICE
CERTIFICATE OF CORRECTION

PATENT NO. : 5,995,638 
DATED : Nov. 30, 1999
INVENTOR(S) : Isaac AMIDROR, Roger D. HERSCH It is certified that error appears in the above-identified patent and that said Letters Patent is hereby corrected as shown below:

Col. 14, line 17, center the section title "A preferred case: the (1,0,-1,0)-moire".

Col. 14, line 27, change "$C_{i,j}$" to —$c_{i,j}$—.

Col. 14, line 45, change "angle difference a;" to —angle difference $\alpha$;—.

Col. 14, line 59, change "FIG. SA" to —FIG. 5A—.

Col. 15, line 5, change "angle difference a" to —angle difference $\alpha$—.

Col. 15, line 39, center the section title "The orientation of the (1,0,-1,0)-moire intensity profiles".

Col. 16, lines 15–16, center the section title "Authentication of documents using the intensity profile of moire patterns".

Col. 19, line 5, center the section title "The multichromatic case".

Col. 20, line 10, center the section title "Covert anticounterfeit and authentication means".

Col. 24, line 37, change "step 3):" to —step 3).—.

UNITED STATES PATENT AND TRADEMARK OFFICE
CERTIFICATE OF CORRECTION

PATENT NO. : 5,995,638
DATED : Nov. 30, 1999
INVENTOR(S) : Isaac AMIDROR, Roger D. HERSCH It is certified that error appears in the above-identified patent and that said Letters Patent is hereby corrected as shown below:

Col. 25, lines 31–32, center the section title "Computer-based authentication of documents by matching prestored and acquired moire intensity profiles".

Col. 25, line 40, change "$\phi_1$, $\phi_2$" to —$\varphi_1$, $\varphi_2$—.

Col. 25, line 64, change "$\phi_1$, $\phi_2$" to —$\varphi_1$, $\varphi_2$—.

Col. 26, line 17, change "orientation $\phi_1$ and axis 152 at orientation $\phi_2$." to —orientation $\varphi_1$ and axis 152 at orientation $\varphi_2$.—.

Col. 26, line 30, change "error, a scaling error a," to —error $\delta$, a scaling error $\sigma$,—.

Col. 26, line 67, change "error a" to —error $\sigma$—.

Col. 27, line 3, change "error care" to —error $\sigma$ are—.

Col. 27, line 10, change "error 6" to —error $\delta$—.

Col. 28, line 21, change "at least one fill" to —at least one full—.

Col. 28, lines 26–27, change "orientations $(\phi_1,\phi_2)$" to —orientations $(\varphi_1,\varphi_2)$—.

UNITED STATES PATENT AND TRADEMARK OFFICE
CERTIFICATE OF CORRECTION

PATENT NO. : 5,995,638
DATED : Nov. 30, 1999

INVENTOR(S) : Isaac AMIDROR, Roger D. HERSCH

It is certified that error appears in the above-identified patent and that said Letters Patent is hereby corrected as shown below:

Col. 28, line 27, change "Regarding image" to —(Regarding image—.

Col. 29, line 1, change "$\tau_{max}$" to —$\sigma_{max}$—.

Col. 29, line 31, change "a can be done" to —$\sigma$ can be done—.

Col. 29, line 46, change "(m,x)" to —$(\tau_x, \tau_y)$—.

Col. 30, lines 48–49, center the section title "Apparatus for the authentication of documents using the intensity profile of moire patterns".

Col. 31, line 33, center the section title "Advantages of the present invention".

Claim 21 d), line 19, change "intensity profile; where the" to

—intensity profile;

where the—.

UNITED STATES PATENT AND TRADEMARK OFFICE

CERTIFICATE OF CORRECTION

PATENT NO. : 5,995,638

DATED : Nov. 30, 1999

INVENTOR(S) : Isaac AMIDROR, Roger D. HERSCH

It is certified that error appears in the above-identified patent and that said Letters Patent is hereby corrected as shown below:

Claim 26 iv), line 53, change "document; where comparing" to

—document;

where comparing—.

Signed and Sealed this

Fifteenth Day of August, 2000

Attest:

Q. TODD DICKINSON

*Attesting Officer*

*Director of Patents and Trademarks*